United States Patent
Lavrentyev et al.

(10) Patent No.: US 11,175,976 B2
(45) Date of Patent: *Nov. 16, 2021

(54) SYSTEM AND METHOD OF GENERATING DATA FOR MONITORING OF A CYBER-PHYSICAL SYSTEM FOR EARLY DETERMINATION OF ANOMALIES

(71) Applicant: AO Kaspersky Lab, Moscow (RU)

(72) Inventors: Andrey B. Lavrentyev, Moscow (RU); Artem M. Vorontsov, Moscow (RU); Pavel V. Filonov, Moscow (RU); Dmitry K. Shalyga, Moscow (RU); Vyacheslav I. Shkulev, Moscow (RU); Nikolay N. Demidov, Moscow (RU); Dmitry A. Ivanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 328 days.

This patent is subject to a terminal disclaimer.

(21) Appl. No.: 16/456,463

(22) Filed: Jun. 28, 2019

(65) Prior Publication Data

US 2020/0210264 A1 Jul. 2, 2020

(30) Foreign Application Priority Data

Dec. 28, 2018 (RU) .......................... RU2018147245

(51) Int. Cl.
*G06F 11/00* (2006.01)
*G06F 11/07* (2006.01)
*G06N 3/08* (2006.01)
*G06F 16/901* (2019.01)

(52) U.S. Cl.
CPC .......... *G06F 11/079* (2013.01); *G06F 11/076* (2013.01); *G06F 11/0736* (2013.01); *G06F 16/9024* (2019.01); *G06N 3/08* (2013.01)

(58) Field of Classification Search
CPC .. G06F 11/079; G06F 11/3452; G06F 11/076; G06F 11/0736; G06F 11/9024; G06F 11/0754
See application file for complete search history.

(56) References Cited

U.S. PATENT DOCUMENTS

| | | | |
|---|---|---|---|
| 6,611,726 B1 | 8/2003 | Crosswhite | |
| 7,739,143 B1 | 6/2010 | Dwarakanath | |

(Continued)

*Primary Examiner* — Katherine Lin
(74) *Attorney, Agent, or Firm* — Arent Fox LLP; Michael Fainberg

(57) ABSTRACT

The present disclosure provides systems and methods of early determination of anomalies using a graphical user interface. In one aspect such a method comprises: receiving information about one or more features of a cyber-physical system, receiving information about a period of time for monitoring the one or more features, generating a forecast of values of the one or more features of the cyber-physical system over the period of time based on a forecasting model for graphing in a graphical user interface, determining a total error of the forecast for all of the one or more features and determining an error for each of the one or more features over the period of time, determining that the error for one feature of the one or more features is greater than a predetermined threshold and identifying the one feature as a source of an anomaly in the cyber-physical system.

17 Claims, 21 Drawing Sheets

(56) References Cited

U.S. PATENT DOCUMENTS

| | | | |
|---|---|---|---|
| 2014/0108640 A1* | 4/2014 | Mathis | H04L 63/1425 709/224 |
| 2014/0249876 A1 | 9/2014 | Wu et al. | |
| 2018/0176241 A1* | 6/2018 | Manadhata | H04L 63/1425 |
| 2020/0067969 A1* | 2/2020 | Abbaszadeh | G06K 9/6269 |

* cited by examiner

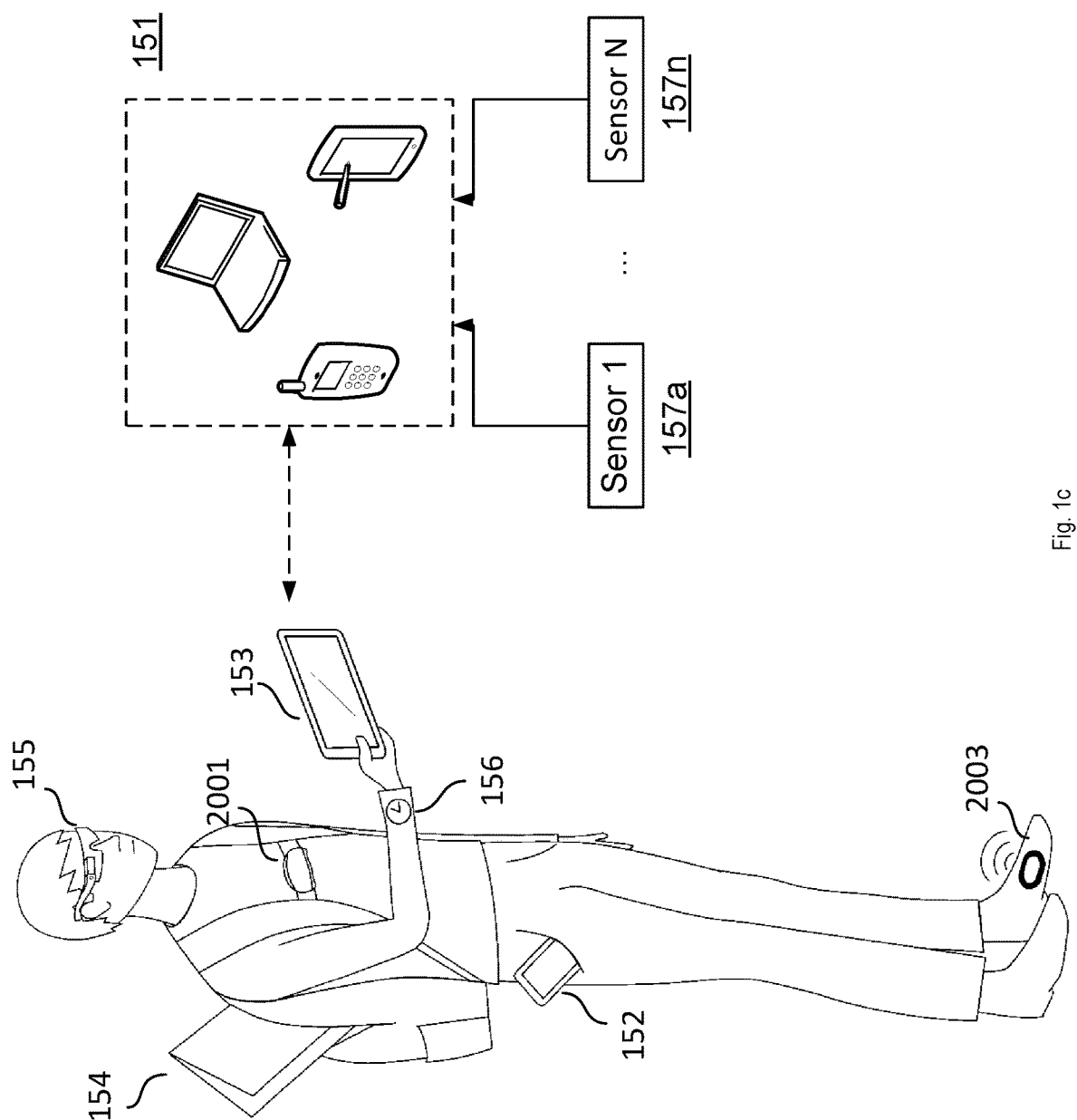

| | |
|---|---|
| 2001 | Heart rhythm monitor |
| 2002 | Sensor of oxygen blood saturation |
| 2003 | Step counter |
| 2004 | Fingerprint sensor |
| 2005 | Gesture sensor |
| 2006 | Camera aimed at eyes |
| 2007 | Sensor of user's body temperature |
| 2008 | Microphone |
| 2009 | Sensor of ultraviolet radiation |
| 2010 | Geolocation receiver |
| 2011 | GSM module |
| 2012 | Bluetooth |
| 2013 | Wi-Fi |
| 2014 | Camera |
| 2015 | Sensor of surrounding temperature |
| 2016 | Barometer |
| 2017 | Electronic compass |
| 2018 | Sensor of humidity |
| 2019 | Sensor of illumination level |
| 2020 | Proximity sensor |
| 2021 | Image depth sensor |
| 2022 | Accelerometer |
| 2023 | Gyroscope |
| 2024 | Hall sensor |
| 2025 | Dosimeter |
| 2026 | NFC module |
| 2027 | LTE module |

Fig. 1d

SYSTEM AND METHOD OF GENERATING DATA FOR MONITORING OF A CYBER-PHYSICAL SYSTEM FOR EARLY DETERMINATION OF ANOMALIES

CROSS-REFERENCE TO RELATED APPLICATIONS

This application claims benefit of priority under 35 U.S.C. 119(a)-(d) to Russian Patent Application No. 2018147245 Filed Dec. 28, 2018, which is incorporated by reference herein in its entirety.

FIELD OF TECHNOLOGY

The disclosure relates to the field of computer security, and more specifically to systems and methods of generating data for the monitoring of a cyber-physical system for early determination of anomalies.

BACKGROUND

One of the urgent problems of industrial safety is the problem of safe operation of technological processes (TP). For example, TPs in the petrochemical sector are characterized by a high degree of danger in production, since they work with highly flammable and explosive liquids and gases under high temperature and pressure. The main threats to such TPs include unintended errors or malicious actions in the operational control, wearing and failure of equipment and subassemblies, computer attacks on the control systems and the computer system, and others.

In order to prevent these threats, the security systems of cyber-physical systems (CPS) are used, for example, those of production facilities and enterprises. The construction of such systems traditionally takes place in several phases. When laying out the enterprise, an emergency shutdown (ESD) system is organized, which is then integrated with the industrial control system of the technological process (ICS TP), although a manual control is also allowed. The drawbacks of the ESD system include substantial response delay of the processes and the presence of the human factor in the decision making process. Moreover, the ESD works under the assumption of proper functioning of the instrumentation. In practice, it is not possible to ensure a failproof working of the instrumentation to its full extent, since the instrumentation periodically malfunctions, it has a tendency towards temporary outages, and the redundancy of all the instrumentation is extremely expensive and not always technically possible.

One method of checking the proper working of a TP is the monitoring of individual subassemblies, equipment, instrumentation, control loops and so forth by built-in self-diagnostic systems. When an outage is detected, such systems send a signal to the operator of the TP and generally involve a manual intervention in one subassembly or another. Despite the obvious benefits of such systems, such as allowing for the specific functioning of a particular subassembly, their development by the equipment provider, and so on, there are a number of obvious drawbacks. The latter include the aforementioned problems with the instrumentation on which the individual self-control systems are built. Another drawback of such systems is that they are local and detached from a monitoring of the processes in their full totality. In other words, each of these systems "sees" the process only in the framework of the equipment or subassembly to which it is linked, with no logical or physical correlation between interrelated subassemblies and installations. As a result, the detecting of an anomaly in the technological process often occurs at the stage of the anomaly becoming a threat to the proper working of a particular piece of equipment and requires an immediate response. Furthermore in certain cases these systems, because of the physical characteristics of the instrumentation (such as paraffin coating of the level gauge with heavy petrochemicals), have a tendency towards repeated false alarms, resulting in the need to disconnect them by the workers.

Another traditional method of nondestructive control of equipment and processes of technological systems (TS), includes the installing of additional control systems external to the equipment and the ICS TP. In fact, with this method of control, a parallel infrastructure is organized, including instrumentation, communication lines, servers for gathering and processing of data, and so forth. Such systems may be integrated with the existing systems of the ICS TP and the ESD, or they may remain external with respect to the ICS TP and the ESD. Despite the obvious benefits of such systems, such as redundancy of the diagnostic instrumentation, narrowly specialized and effective methods of diagnostics, practically unlimited capabilities for processing of diagnostic information, and so on, the primary drawback is high cost and complexity, or at times impossibility, of deploying them in actual production.

Similar problems occur with all cyber-physical systems (CPS) containing sensors and actuators—both for the above-described technological processes which are part of a TS and for the Internet of things (IoT), especially for the industrial Internet of things. For example, on account of computer attacks the sensors of the Internet of things provide false data, resulting in improper working of the computer devices of the Internet of things, which may result in problems such as increased consumption of electricity, unauthorized access to information, and others.

The described systems for the security and monitoring of a CPS usually have a graphic user interface (GUI) with the ability of the user (or operator) to observe the CPS by critical characteristics or features of the CPS. Furthermore, the GUI in such systems is designed to warn the users of the CPS when the readings of the sensors go beyond specified technological ranges. In this case, the user will execute actions to correct the situation which has occurred. However, often the anomalous situation occurs much earlier than when the sensor readings exceed the range, and thus the anomaly could be corrected ahead of time. However, the ability to correct the anomalies ahead of time is not provided for by the existing systems of the GUI for the monitoring of a CPS.

Therefore, the technical problem arises of there not being any system or method of generating data for the monitoring of a cyber-physical system, in order to make a determination of anomalies in a graphic user interface system, wherein the time elapsed from the moment of occurrence of the anomaly in the CPS to the moment of its detection is less than in the prior art.

SUMMARY

The first technical result is the providing of a graphic user interface which allows the user to perform a monitoring of a cyber-physical system for the purpose of early determination of anomalies.

The second technical result is the realization of an automated control by the user of a cyber-physical system for the early determination of anomalies.

According to a variant aspect, a method is used to generate data for the monitoring of the cyber-physical system for the purpose of an early determination of anomalies in a graphic user interface (GUI) system, in which: an element of the GUI for selecting an feature, the element containing, in particular, a list of features of the cyber-physical system (CPS) is used to receive information about the at least one feature of the CPS from the list of features that was selected by the user; an element of the GUI for selecting a period of time is used to receive information about the period of time selected by the user for the monitoring of the selected features of the CPS; a forecasting means is used to generate, for the monitoring time period, a forecast of the values of the features of the CPS with the aid of a model for the forecasting of the values of the selected features of the CPS; an anomaly determination means is used to determine, for the monitoring time period, the total error of the forecast for all the features of the CPS from the list of features and the errors of the forecast for each selected feature of the CPS; an element of the GUI for generating graphs is used to generate graphs for the values of the data generated by the forecasting means and the anomaly determination means for the monitoring time period.

According to one particular variant aspect, the mentioned values of the data generated by the forecasting means and the anomaly determination means include, in particular, the following values: each selected feature of the CPS; a forecast for each selected feature of the CPS; the total error of the forecast for the features of the CPS; errors of the forecast for each selected feature of the CPS; the threshold of the total error of the forecast.

According to another particular variant aspect, in addition the anomaly determination means is used to determine anomalies in the CPS when the total forecast error is greater than a total error threshold, and an element of the GUI for generating graphs is used to generate data about the anomaly in the CPS and to generate a graph of values for at least one of the selected features of the CPS if the contribution of the forecast error of that at least one feature of the CPS to the total forecast error is greater than the contribution of at least one other feature of the CPS among all the features of the CPS on the list of features to the total forecast error.

According to yet another particular variant aspect, at least one additional element of the GUI for selection of the generating mode is used to receive information about the mode, selected by the user, of monitoring the selected features of the CPS: real-time mode or coding/decoding mode, wherein if real-time mode is selected, then the mentioned element of the GUI for generating of graphs is used to generate graphs of those values at the current moment of time.

According to one particular variant aspect, at least one element of the GUI for selection of events is used to generate a list of events of the CPS in which an anomaly occurred and, upon one of these events being selected by the user, the mentioned graph of values of the mentioned data is generated for the selected event at the time of occurrence of the anomaly and for the indicated monitoring time period.

According to another particular variant aspect, the mentioned list of events of the CPS for each of the selected features of the CPS additionally contains: an identifier of the feature; a description of the feature; the forecast errors for the feature; the observable value of the feature; the forecast value of the feature; the units of measurement of the feature; the allowable limits of change of the feature; the link of the feature to the equipment.

According to yet another particular variant aspect, at least one element of the GUI for the grouping of features is used to obtain information about a group of features selected by the user, especially those pertaining to the same PID controller, and the mentioned element of the GUI for generating graphs is used to generate graphs of the values of the mentioned data for the indicated monitoring time period for the features of the CPS from the selected group of features.

According to one particular variant aspect, at least one element of the GUI is used to generate sublists from the features of the CPS selected by the user and, upon the user selecting the mentioned sublist, the element of the GUI for generating graphs is used to generate the graph of values for the features from the mentioned sublist.

According to another particular variant aspect, at least one element of the GUI for selection of the generating mode is used to obtain information about the mode, selected by the user, of generating or not generating the forecast error for the selected features of the CPS in the graph generating element of the GUI.

According to yet another particular variant aspect, at least one element of the GUI is used to obtain information on the method, selected by the user, of sorting and displaying the selected features on the element of the GUI for generating graphs of the features; wherein upon selecting a sorting mode, the graphs of the values of the features are sorted by largest forecast error—from the largest forecast error for the feature in the first graph to the smallest forecast error for the feature in the last graph.

According to one particular variant aspect, a training means and a calculation means are also present, while the training of the model for forecasting of values of the features of the CPS and calculating the threshold of the error for the determination of an anomaly in a CPS possessing defined characteristics is done by the following sequence of steps: the training means is used to obtain an initial sample (also dataset or set), containing values of the features of the CPS for a historical period of observation of the CPS, in which the percentage of anomalies does not exceed a given value; on the basis of the initial sample, and taking into account the characteristics of the CPS, the training means is used to generate a training sample, including values of at least one of the aforementioned features of the CPS for the period of observation which is contained in the historical period of observation; the training means is used to construct a model for the forecasting of the values of the features of the CPS at each moment of time of a forecast window based on the data of the values of those features of the CPS at each moment of time of an input window, where the input window and the forecast window are intervals of time contained in the period of observation, and depending on the characteristics of the CPS the distance is selected between the input window and the forecast window to be equal to the forecast horizon, which is chosen in dependence on the characteristics of the CPS; the training means is used to perform a training of the forecast model based on the data of the training sample; the taught forecast model, using the calculation means, is used to make a forecasting of the values of the features of the CPS at each moment of time of the observation period; the calculation means is used to determine the total forecast error, obtained with the use of the constructed forecast model at each moment of the observation period; the training means is used to calculate the total error threshold in dependence on the characteristics of the CPS, such that an exceeding of the calculated threshold by the total forecast error means an anomaly in the CPS.

According to another particular variant aspect, the forecasting means is used to obtain the values of the features of the CPS for the input window, which is an interval of time and is contained within the period of observation, the input window being determined by the taught forecasting model; the forecasting means, using the taught forecasting model and based on the data of the obtained values of the features of the CPS for the input window, makes a forecast of the values of the features of the CPS for the forecast window, which is an interval of time and is contained within the period of observation; the anomaly determination means is used to determine, for the forecast window, the total forecast error for the features of the CPS; the anomaly determination means, if the total forecast error is greater than the threshold of the total error, is used to determine an anomaly in the CPS; the anomaly determination means is used to determine at least one feature of the CPS which is the source of the anomaly if the forecast error contribution from that at least one feature of the CPS to the total forecast error is greater than the contribution of at least one other feature of the CPS to the total forecast error.

According to a variant aspect, a system for generating data for the monitoring of a cyber-physical system is used for an early determination of anomalies in a graphic user interface (GUI) system and comprises: a GUI element for the selection of an feature, the element containing in particular a list of features of the cyber-physical system (CPS), and being designed to receive information about at least one feature of the CPS selected by the user from the list of features; a GUI element for the selection of a period of time, designed to receive information about the period of time selected by the user for the monitoring of the selected features of the CPS; a forecasting means, designed to make a forecast for the selected features of the CPS for the monitoring time period; an anomaly determination means, designed to determine the total forecast error for all the features of the CPS from the list of features and the forecast errors for each selected feature of the CPS during the monitoring time period; and a GUI element for generating graphs, designed to generate graphs in the monitoring time period for the values of the data generated by the forecasting means and the anomaly determination means.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

Additional goals, features, and advantages of the present disclosure will become evident from a reading of the following description of an aspect of the disclosure with reference to the enclosed drawings, in which:

FIG. 1c presents a possible variant organization of the Internet of Things using the example of wearable devices.

FIG. 1d presents a possible array of sensors of devices.

DETAILED DESCRIPTION

Figure 1A:
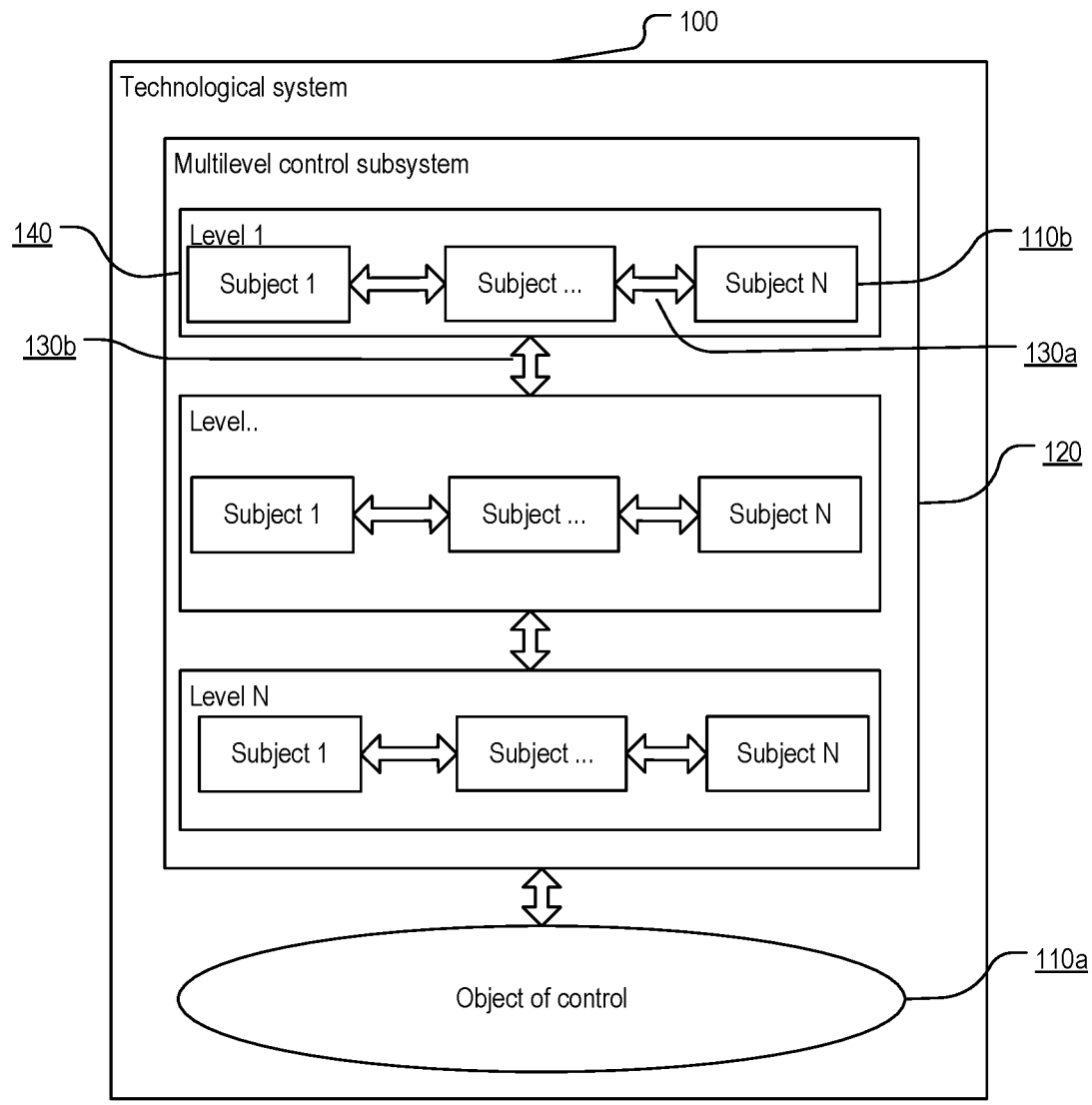
FIG. 1a schematically shows an example of a technological system according to exemplary aspects of the present disclosure.

Exemplary aspects are described herein in the context of a system, method, and computer program product of stepwise increasing the it security of elements of a technological system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following definitions and concepts will be used in describing variant aspects of the disclosure.

An object of control is a technological object to which external (controlling and/or perturbing) actions are applied with the goal of altering its state, such objects being in particular a device (such as an electric motor) or a technological process (or a portion thereof).

A technological process (TP) is a process of material production consisting in the consecutive altering of the states of a material entity (an object of labor).

The control of a technological process (or process control) is a set of methods used to control the technological parameters during the production of an end product.

A control loop consists of material entities and controlling functions necessary for the automated regulating of the values of metered technological parameters to the values of desired settings. A control loop contains sensors, controllers, and actuators.

A technological parameter (or process variable, PV) is a current metered value of a particular part of a TP which is being observed and controlled. A technological parameter may be the measurement of a sensor, for example.

A setpoint is a value of a technological parameter which is being maintained.

A controllable parameter (or manipulated variable, MV) is a parameter which is regulated such that the value of the technological parameter is maintained at the level of a setpoint.

An external action is a method of altering the state of an element to which the action is applied (for example, an element of a technological system (TS)), in a defined direction, the action being transmitted from one element of the TS to another element of the TS in the form of a signal.

The state of an object of control is the aggregate of its essential properties expressed by the parameters of states which can be altered or maintained under the influence of external actions, including controlling actions from a control subsystem. A parameter of state is one or more numerical values characterizing an essential property of the object, in a particular instance a parameter of state is a numerical value of a physical quantity.

The formal state of an object of control is the state of the object of control that corresponds to a process chart or other technological documentation (in the case of a TP) or movement itinerary (in the case of a device).

A controlling action is a targeted (the target of the action is to act on the state of the object), legitimate (specified by the TP), external action from the subjects of control of a control subsystem on an object of control, resulting in a change in the state of the object of control or the maintaining of the state of the object of control.

A perturbing action is a targeted or non-targeted, illegitimate (not specified by the TP), external action on the state of an object of control, including an action from a subject of control.

A subject of control is a device which applies a controlling action to an object of control or sends a controlling action to another subject of control for manipulation before being applied directly to the object.

A multilevel control subsystem is an aggregate of subjects of control including several levels.

A cyber-physical system is an IT concept involving the integration of computer resources in physical processes. In such a system, the sensors, equipment, and IT systems are connected along the entire value-added chain, going beyond the bounds of a single enterprise or business. These systems interact with each other by way of standard Internet protocols for forecasting, self-adjusting, and adapting to changes. Examples of a cyber-physical system are a technological system, the Internet of Things (including wearable devices), and the industrial Internet of Things.

The Internet of Things (IoT) is a computer network of physical objects ("things") equipped with built-in technologies for interacting with each other or with their environment. The Internet of Things includes such
technologies as wearable devices, electronic systems of transportation means, smart cars, smart cities, industrial systems, and others.

The Industrial Internet of Things (IoT) is a subcategory of the Internet of Things which likewise includes applications oriented to the consumer, such as wearable devices, "smart home" technologies and automobiles with automatic control. The distinguishing feature of both concepts is devices with built-in sensors, machine tools, and infrastructure, which send data via the Internet and are controlled by means of software.

A technological system (TS) is a functionally interconnected aggregate of subjects of control of a multilevel control subsystem and an object of control (a TP or a device), realizing by a change in the states of the subjects of control a change in the state of the object of control. The structure of a technological system is formed by the basic elements of the technological system (the interconnected subjects of control of the multilevel control subsystem and the object of control), as well as the links between these elements. In the event that the object of control in a technological system is a technological process, the end goal of the control is: by changing the state of the object of control, to change the state of an object of labor (raw materials, semi-finished blanks, and so on). In the event that the object of control in a technological system is a device, the end goal of the control is to change the state of the device (a means of transportation, a spacecraft). A functional relationship among the elements of a TS presupposes a relationship among the states of these elements. There might not even be a direct physical link between the elements, for example, there is no physical link between the actuators and the technological operation, yet cutting speed for example is functionally related to the frequency of rotation of a spindle, even though these parameters of states are not physically linked.

The state of a subject of control is the aggregate of its essential properties, expressed by the parameters of states which can be altered or maintained under the influence of external actions.

Essential properties (and accordingly, essential parameters of state) of a subject of control are properties having direct influence on the essential properties of state of the object of control. The essential properties of an object of control are properties having direct influence on controllable factors (the precision, safety, effectiveness) of the functioning of the TS. For example, the conformity of cutting conditions to formally specified conditions, the movement of a train according to its itinerary, the maintaining of a reactor temperature within allowable bounds. Depending on the controllable factors, parameters of state of the object of control are selected and accordingly associated parameters of state of the subjects of control exerting a controlling action on the object of control are collected.

The state of an element of a technological system is the state of a subject of control or object of control.

The real state of an element of a technological system is the state of an element of the technological system at a certain moment of time of action on the object of control, as determined by metering of the parameters of state and the intercepting of signals (traffic) between the elements of the TS. The metering of the parameters of state is done, for example, with the aid of sensors installed in the TS.

The real state of a technological system is the aggregate of interrelated real states of the elements of the technological system.

A cybernetic block is an element of a cyber-physical control system that controls the process of functioning of an element of a technological system.

The state space is a method of formalizing the change in states of a dynamic system (a technological system or cyber-physical system).

A computer attack (also referred to as a cyber-attack) is a targeted action on IT systems and data telecommunication networks by software carried out for purposes of disrupting the security of information in these systems and networks.

FIG. 1a shows schematically an example of a technological system 100, which includes elements 110a and 110b, where the elements of the TS are: an object of control 110a; subjects of control 110b, forming a multilevel control subsystem 120; horizontal links 130a and vertical links 130b. The subjects of control 110b are grouped by levels 140.

Figure 1B:
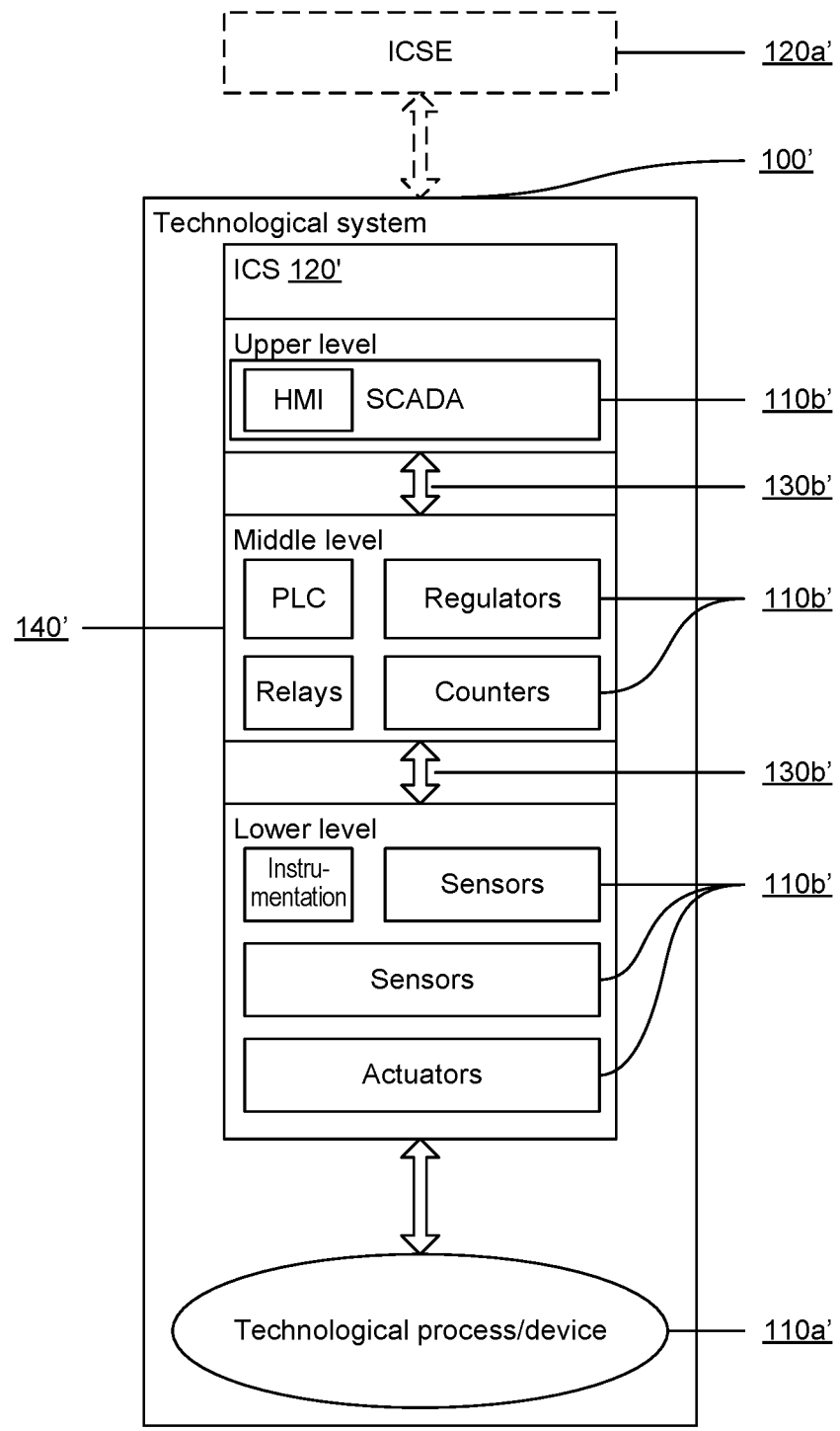
FIG. 1b schematically shows a particular example of an implementation of a technological system according to exemplary aspects of the present disclosure.

FIG. 1b shows schematically a particular example of the implementation of a technological system 100'. An object of control 110a' is a TP or a device; the object of control 110a' is subjected to controlling actions which are developed and realized by an automated control system (ICS) 120'; in the ICS, three levels 140' are realized, consisting of subjects of control 110b', which are interconnected by both horizontal links on the horizontal (links within a level are not shown in the figure) and by vertical links 130b' along the vertical (links between levels). The interrelationships are functional, i.e., in the general case a change in state of a subject of control 110b' on one level produces a change in state of the subjects of control 110b' related to it on this level and other levels. Information about the change in state of the subject of control is sent in the form of a signal along the horizontal and vertical links established between the subjects of control, i.e., information about a change in state of the subject of control in question is an external action with respect to the other subjects of control 110b'. The levels 140' in the ICS 120' are distinguished in accordance with the purpose of the subjects of control 110b'. The number of levels may vary according to the complexity of the automated control system 120'. Simple systems might contain one or more lower levels. Wired networks, wireless networks, and integrated microcircuits are used for the physical link between the elements of the TS (110a, 110b) and the subsystems of the TS 100; Ethernet, industrial Ethernet, and industrial networks are used for the logical link between the elements of the TS (110a, 110b) and the subsystems of the TS 100. Different types and standards of industrial networks and protocols are used: Profibus, FIP, ControlNet, Interbus-S, DeviceNet, P-NET, WorldFIP, LongWork, Modbus and others.

The upper level (the level of supervisory control and data acquisition, SCADA) is the level of dispatch operator control and it includes at least the following subjects of control 110b': controllers, controlling computers, human-machine interfaces (HMI) (depicted in FIG. 1b as a single SCADA subject of control). The level is meant to monitor the states of the elements of the TS (110a', 110b'), to obtain and accumulate information about the state of the elements of the TS (110a', 110b'), and to correct it when necessary.

The middle level (the CONTROL level) is the level of the controllers and it includes at least the following subjects of control: programmable logic controllers (PLC), counters, relays, and regulators. The subjects of control 110b' of PLC type receive information from the subjects of control of instrumentation type and the subjects of control 110b' of sensor type as to the state of the object of control 110a'. The subjects of control of PLC type put out (create) a controlling action in accordance with a programmed control algorithm to the subjects of control of actuator type. The actuators directly realize this (apply it to the object of control) on the lower level. The actuator is part of an effectuating device (equipment). The regulators, such as proportional-integral-derivative (PID) controllers, are devices in a control loop with feedback.

The lower level (the Input/Output level) is the level of subjects of control such as: sensors, instrumentation controlling the state of the object of control 110a', and also actuators. The actuators act directly on the state of the object of control 110a', to bring it into conformity with the formal state, i.e., a state corresponding to a technological specification, process chart, or some other technological documentation (in the case of a TP) or a movement itinerary (in the case of a device). On this level, a coordination is performed between the signals from the subjects of control 110b' of sensor type and the inputs of the subjects of control of the middle level, and a coordination is performed between the controlling actions developed by the subjects of control 110b' of PLC type and the subjects of control 110b' of actuator type that are realizing those actions. An actuator is part of an effectuating device. An effectuating device carries out the displacement of a regulating element in accordance with signals arriving from a regulator or controlling device. The effectuating devices are the last link in the chain of automatic control and in the general case they consist of blocks:

of an amplifier device (a contactor, frequency converter, amplifier, etc.);

of an actuator (electric, pneumatic, hydraulic drive) with feedback elements (sensors of the position of an output shaft, signals of end positions, manual drive, etc.);

of a regulating element (valves, gates, slides, etc.).

Depending on the application conditions, the effectuating devices may differ in design from each other. Usually actuators and regulating elements are assigned to the basic blocks of effectuating devices.

In a particular example, the effectuating device as a whole is called an actuator.

The industrial control system for enterprise (ICSE) 120a' is an automatic control system of an enterprise.

FIG. 1c shows one possible variant organization of the Internet of Things using the example of wearable devices. The system contains, in one aspect, a multitude of different user computer devices 151. Among the user devices 151 there may be, for example: a smartphone 152, a tablet 153, a notebook 154, wearable devices such as augmented reality glasses 155, a fitness tracker, a smart watch 156, and others. The user devices 151 contain many different sensors 157a-157n, such as a heart rhythm monitor 2001 and a step counter 2003.

It should be noted that the sensors 157a-157n may reside on a single user device 151 or on several devices. Moreover, several sensors may reside on several devices at the same time. Some of the sensors may be represented in several copies. For example, a Bluetooth module may be present on all the devices, while a smartphone may contain two or more microphones needed for noise suppression and determining the distance to a sound source.

FIG. 1d presents a possible array of sensors of the devices 151. Among the sensors 157a-157n there may be the following, for example:
- a heart rhythm monitor (heartbeat sensor) 2001 for determining the pulse of the user. In one exemplary aspect, the heart rhythm monitor may contain electrodes and measures the electrocardiogram;
- a blood oxygen saturation sensor 2002;
- a step counter 2003;
- a fingerprint determination sensor 2004;
- a gesture sensor 2005, used for recognizing gestures of the user;
- a camera, directed at the eyes of the user 2006, serving to determine movement of the eyes of the user, as well as to authenticate the identity of the user by the iris or retina of the eye;
- a sensor of the body temperature of the user 2007 (for example, one having direct contact with the user's body or a non-contact type);
- a microphone 2008;
- an ultraviolet radiation sensor 2009;
- a receiver of a geolocation system 2010, such as a GPS, GLONASS, BeiDou, Galileo, DORIS, IRNSS, QZSS or other receiver;
- a GSM module 2011;
- a Bluetooth module 2012;
- a Wi-Fi module 2013;
- a camera 2014 directed at the surroundings of the user device;
- a sensor of the temperature of the surroundings 2015;
- a barometer 2016, needed to measure the atmospheric pressure and determine the altitude above sea level according to the atmospheric pressure;
- a geomagnetic sensor 2017 (electronic compass), needed to determine the cardinal points and the azimuth;
- a sensor for determining the humidity of the air 2018;
- a sensor for the level of illumination 2019, needed to determine the color temperature and luminosity;
- a proximity sensor 2020, serving for determining the distance to different objects located in the vicinity;
- a sensor of image depth 2021, serving to obtain a three-dimensional image of space;
- an accelerometer 2022, serving to measure the acceleration in space;
- a gyroscope 2023, needed to determine the position in space;
- a Hall (magnetic field) sensor 2024, to determine the magnetic field strength;
- a dosimeter/radiometer 2025, to determine the radiation level;
- a NFC module 2026;
- a LTE module 2027.

Figure 2:
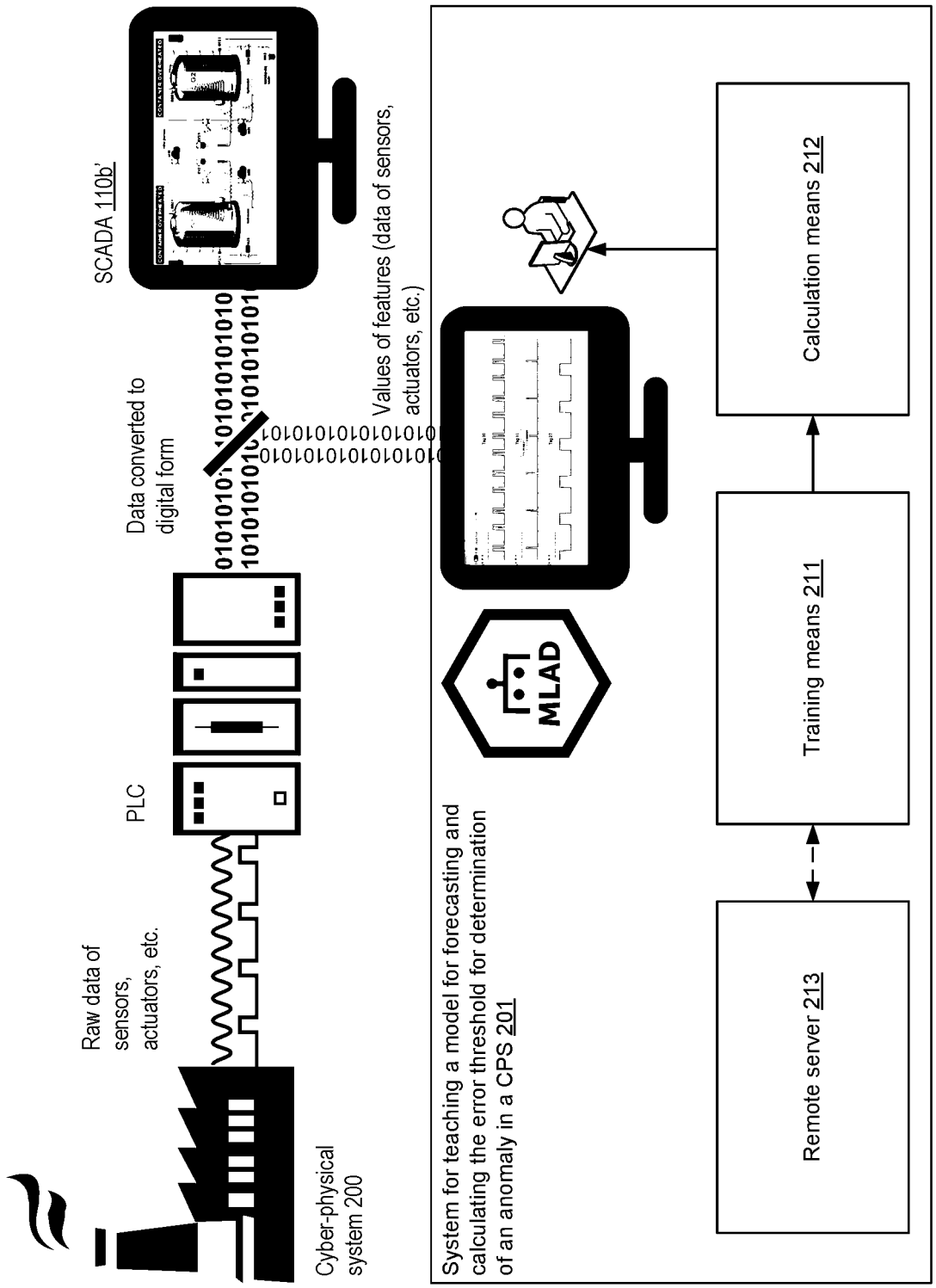
FIG. 2 presents a system for training a model for forecasting values of features of a CPS having definite characteristics and for calculating the error threshold for the determination of an anomaly in that CPS according to exemplary aspects of the present disclosure.

FIG. 2 presents a system for training a model for forecasting values of features of a cyber-physical system (CPS), possessing defined characteristics (that is, the characteristics of the CPS are considered when training the forecasting model), and for calculating the error threshold for determining an anomaly in that CPS 201. The cyber-physical system 200 is presented in a simplified variant. Examples of the cyber-physical system 200 are the previously described technological system 100 (see FIG. 1a-1b), the Internet of Things (see FIG. 1c-1d), and the industrial Internet of Things. In order to be definite in the rest of the application, the TS is considered as the main example of a CPS 200.

The system 201 contains a training means 211 and a calculation means 212 connected to it. As previously mentioned in the description of FIG. 1a-1b, the CPS contains multiple subjects of control, such as sensors, actuators, and PID controllers. The data from these subjects is sent in non-processed form to the PLC. An analog signal may be used for this. The PLC then performs a processing of the data and transforms the data into digital form, after which it is sent to the SCADA system 110b' and the system in question 201. Thus, the training means 211 obtains an initial sample, containing the values of the features of the CPS 200 for a historical period of observation of the CPS (that is, the telemetry data of the CPS), in which the percentage of anomalies does not exceed a given value (such as not more than 1%). The features of the CPS are numerical characteristics of the subjects of control—the sensors, actuators, and PID controllers. The training means 211, on the basis of the initial sample and taking into account the characteristics of the CPS, generates a training sample, including the values of at least one of the obtained features of the CPS in a period of observation not greater than the historical period of observation. In a particular exemplary aspect, the training sample includes at least one moment of time when an anomaly has occurred. The generating of the training sample may include the step of cleaning the data of the initial sample from noise, gaps in data, outliers in the values of the features, and invalid data sets, the step of converting to a uniform time grid, and the step of eliminating features from the initial sample that cause false alarms (such as the readings of a faulty sensor). In a particular exemplary aspect, the generating of the training sample may occur with the use of technical documentation of the CPS (such as that describing possible states and technical characteristics of the sensors and actuators), and also on the basis of data provided by the users of the CPS (such as that concerning known faulty sensors).

The training means 211 then carries out the construction of a model for forecasting the values of the features of the CPS at every moment of time of the forecast window based on the data of the values of the features of the CPS at every moment of time of the input window. That is, the input window and the forecast window are intervals of time which are situated within the period of observation and which are chosen in accordance with the characteristics of the CPS. And the values of the features of the CPS are saved with a given periodicity in the bounds of the period of observation. For example, if the values of the features of the CPS are saved every second, then the aforementioned moments of time are also different from each other after every second. The distance between the input window and the forecast window is the forecast horizon (for example, from the end of the input window to the start of the forecast window), which also depends on the characteristics of the CPS. In a particular exemplary aspect, the input window and the forecast window may be intersecting each other. In another particular exemplary aspect, the input window and the forecast window are not intersecting each other. The forecast horizon may take on both non-negative values (a forecast for the future) and negative values (for example, an analysis of coding/decoding type).

The training means 211 then carries out the training of the forecasting model using the data of the training sample. The calculation means 212 using the taught forecasting model then makes a forecast of the values of the features of the CPS at every moment of time of the observation period. The calculation means 212 determines the total forecast error (that is, for the forecast values of the features of the CPS), for example as the mean error or the mean weighted error between the observable values of the features and the forecast values of the features, computed at every moment of time of the forecast window. After this, the training means 211 is used to calculate the threshold of the total error in dependence on the characteristics of the CPS, such that an anomaly in the CPS is signified if the calculated threshold is exceeded by the total forecast error. In a particular exemplary aspect, this is a quantile of specified precision of the total forecast error, for example, at a 99% significance level.

An anomaly in the CPS may arise, for example, on account of a computer attack, on account of an intervention in the working of the TS or TP by a person, on account of a malfunction or a deviation of the technological process relating to periods of shift change, on account of a switching of the control loops to manual operation or on account of incorrect sensor readings, and also for other reasons known in the prior art.

In a particular exemplary aspect, the system 201 additionally contains a remote server 213, which can perform some of the functions of the training means 211 and the calculation means 212: the construction of the forecasting model and the training of the forecasting model, as well as the forecasting of the values of the features of the CPS for the period of observation, the determining of the total forecast error, and the calculating of the threshold of the total forecast error. In yet another particular exemplary aspect, the training means 211 and the calculation means 212 may reside on the remote server 213. Since the remote server 213 may have substantially greater computing capabilities than the training means 211 and the calculation means 212, the performing of these functions by the remote server 213 enables a greater speed and quality of working of the system 201.

Figure 4:
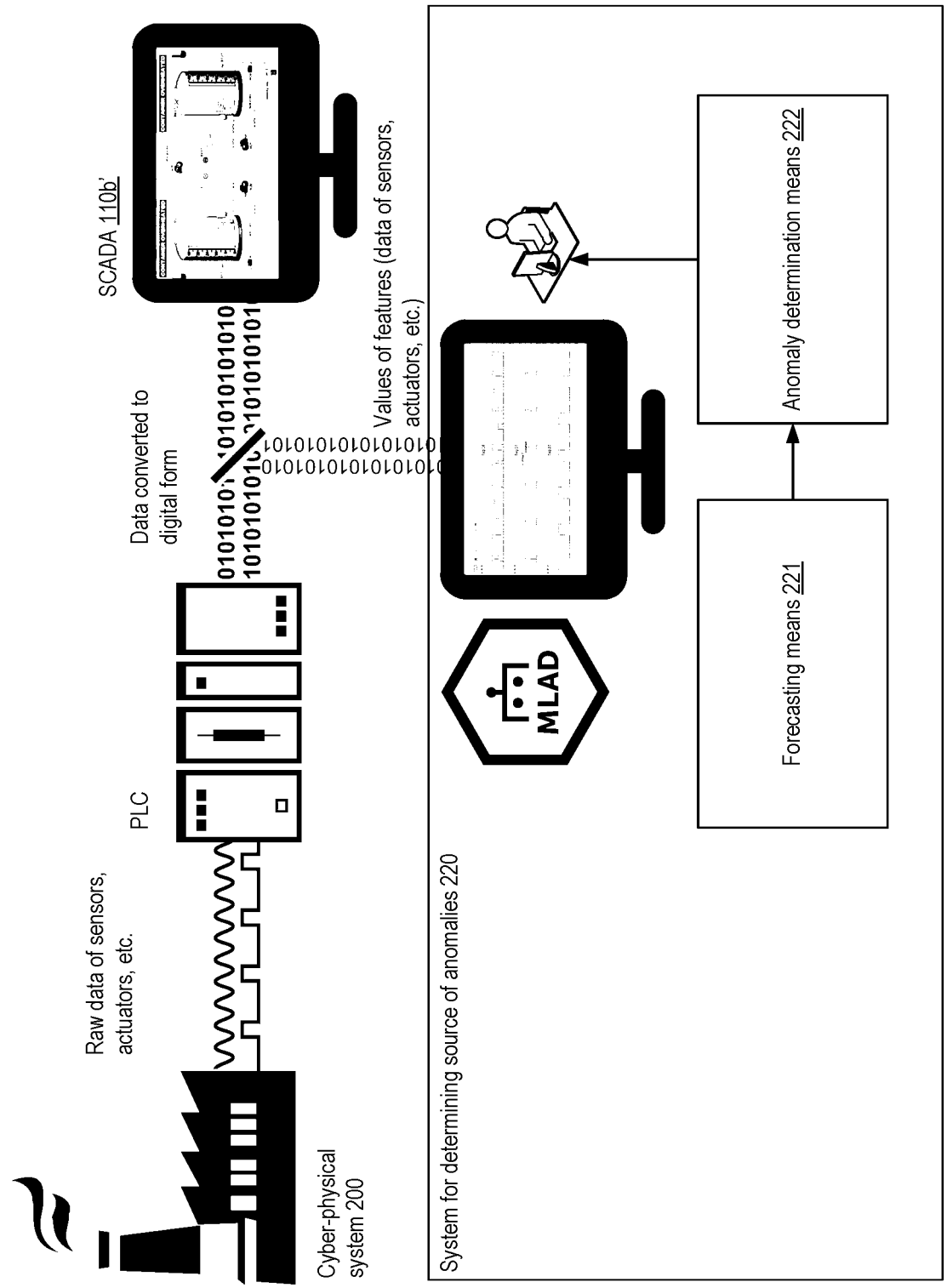
FIG. 4 presents a system for determining the source of an anomaly of the CPS according to exemplary aspects of the present disclosure.
Figure 5:
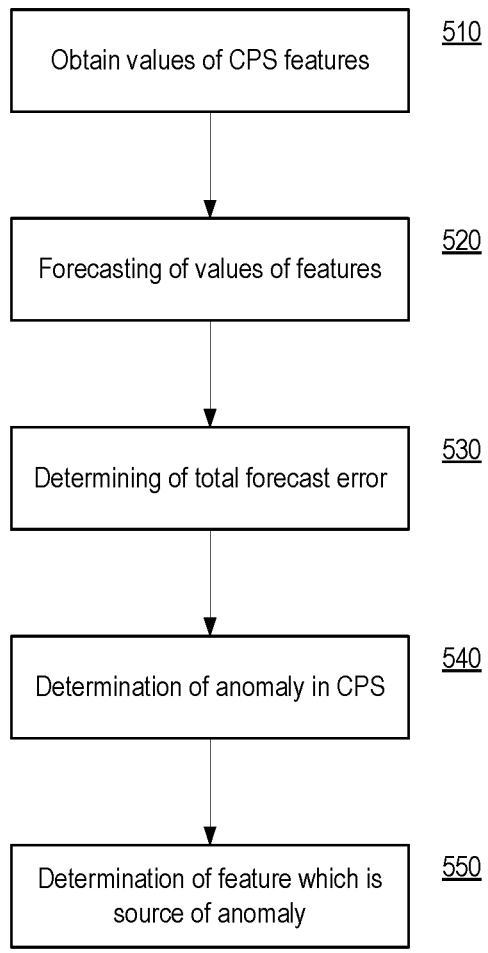
FIG. 5 presents an example of determining the source of an anomaly in the CPS possessing the defined characteristics.

Thus, the system 201 enables a training of the forecasting model and a determining of the size of the input window and the forecast window, as well as the threshold of the total forecast error, which may be used in the system and method for determining the source of an anomaly in the CPS (see FIG. 4-5).

In a particular exemplary aspect, the features of the CPS include at least one of:
- a measurement of a sensor (a technological parameter of a sensor);
- a controllable parameter of an actuator;
- a setpoint of an actuator;
- the input signals or the output signal of a PID controller, the internal parameters of a PID controller.

In yet another particular exemplary aspect, moments of time are marked out in the initial sample with known anomalies of the CPS, those moments of time with known anomalies of the CPS being included in the training sample. That is, the initial sample will also contain information about the moments of time when known anomalies occurred in the CPS (a mark-up). This will make it possible to teach the forecasting model and determine the total error threshold more accurately.

In another particular exemplary aspect, when generating the training sample a mark-up is performed for moments of time when anomalies of the CPS occurred. In yet another particular exemplary aspect, from the initial sample there is generated a test sample, whose data are used to evaluate the forecast quality, and if the evaluation of the forecast quality does not meet specified criteria then the training of the forecasting model is repeated until such time as the evaluation of the forecast quality meets the specified criteria (so that no overtraining occurs). But if the evaluation of the forecast quality does not meet the specified criteria, a different forecasting model may be selected. In a particular example, the forecast quality is determined, for example, by one of the quality metrics: the NAB (Numenta Anomaly Benchmark) metric, the F1 metric.

In a particular exemplary aspect, the cyber-physical system has at least one of the following characteristics:
- the branch of industry in which the cyber-physical system is functioning;
- the types of processes described by the parameters of the CPS, in particular, one of: continuous, conveyor type, cyclical (for example, for cyclical processes one may select a period of observation which is a multiple of the period of one cycle);
- the presence of seasonality and/or trends in the features of the CPS;
- the inertness of the processes of the CPS;
- the response time of the CPS to changes occurring in the CPS and in the surroundings;
- the danger level of the production for the workers and the ecology;
- the cost of a standstill of the technological processes due to abnormal situations;
- the type of control, in particular, whether performed with the use of PID controllers, finite automata, or a combined method;
- the type of the subject of control, characterized by at least one feature, the type of the subject of control being one of: a sensor, an actuator, or a PID controller;
- the self-diagnostic data of the CPS;
- the serviceability status of the subject of control (serviceable or faulty);
- the relationship of the subjects of control at the level of the technical process.

As an example of the CPS one may mention enterprises from the petrochemical industry, their individual blocks and installations. The CPS of such enterprises may possess one or more of the following CPS characteristics:
- a high value of the period of time of uninterrupted functioning of the technological processes (for example, over a year);
- a high response time of the TP (for example, longer than one minute), therefore, when constructing the forecasting model, a larger period of observation will be selected for the type of CPS characterized by a larger response time of the parameters of the CPS to changes in other parameters of the CPS and external factors;
- the presence of seasonality of the TP;
- a high level of danger of the production for workers and the ecology. Accordingly, when constructing the forecasting model a low total error threshold will be chosen for a CPS characterized by a high level of danger of production, in order to detect a larger number of anomalies. That is, the total error threshold may be calculated as a quantile of specified accuracy of the total forecast error, a quantile of lower order (such as 0.90). It is likely that false alarms will occur, but this in no way affects the production process, and in the stage of data analysis of coding/decoding type with the use of the constructed model it will make it possible to detect a larger number of anomalies and to refine the error threshold value with the participation of the CPS user in order to screen out the false alarms while keeping all important anomalies analyzed;

a high cost of a standstill in the TP.

Technological processes in primary petroleum refining are characterized by the presence of control systems based on PID control (cascade) principles and containing a large quantity (usually more than a hundred) self-regulating control loops, which are interrelated both by the designed and embedded control logic and by the physics of the process, and which monitor such quantities as temperature, pressure, liquid levels, and others. The design specifics of such a control system make it possible to realize a full array of process monitoring methods, including neural nets, methods for analysis of the integrity of PID controller firmware and for analysis of their proper setpoints, and so forth. The presence of specific factors of petroleum refining such as high paraffin content of the liquid components of the process, high processing temperatures (usually in the order of 350 degrees Celsius), coke formation and coke clogging in subassemblies, and other factors, is responsible for peculiarities of these parameters such as the presence of intense noise, gaps, outliers in instrumentation data, the presence of trend components in the control data, the invalidity of certain instrumentation data sets, and so forth. Furthermore, other peculiarities of a control system based on PID controllers are factors such as the periodic switching of the PID controllers to manual mode, which is done both for regular control of the installations and in abnormal situations (having substantial influence on the data of the parameters). Thus, in the mentioned example, the characteristics of the CPS influence the values of the features of the CPS, the construction of the forecasting model, and the determination of the total forecast error.

Therefore the described method makes it possible to shorten, as compared to the prior art, the time elapsing from the moment of occurrence of an anomaly in a cyber-physical system (CPS) possessing certain characteristics until the moment of its detection, thanks to the construction of a model for forecasting the values of the features of the CPS and the calculation of the total error threshold of the CPS in dependence on the characteristics of the CPS, such that the passing of the calculated threshold by the total forecast error means an anomaly in the CPS. The accuracy will also be improved for the detection of anomalies in a CPS possessing certain characteristics thanks to the construction of a model for forecasting the values of the features of the CPS and the calculation of the total error threshold of the CPS in dependence on the characteristics of the CPS. Moreover, a system will be created for the determination of anomalies in a CPS possessing certain characteristics in which the time elapsing from the moment of occurrence of an anomaly in the CPS until the moment of its detection is lower than that of the existing prior art.

Thus, in one particular exemplary aspect a low total error threshold is chosen for a type of CPS characterized by a high level of danger of production to the workers and the ecology. In another particular exemplary aspect, a larger period of observation is chosen for a CPS characterized by a larger response time of the features of the CPS to changes in other features of the CPS and external factors.

In yet another particular exemplary aspect, weighting factors are used when computing the total forecast error for the errors of each feature of the CPS, wherein:

a low value is assigned to the weighting factor for an feature if the subject of control characterized by that feature provides data with noise or invalid data or is periodically disconnected by the user of the CPS;

a low value is assigned to the weighting factor for an feature in which the occurrence of an anomaly does not influence the working of the CPS, and a high value is assigned to the weighting factor for an feature in which the occurrence of an anomaly influences the working of the CPS.

Values of weighting factors of the features which are equal to unity are characteristic of the basic variant aspect (tantamount to an absence of weighting factors).

In yet another particular exemplary aspect, the training sample further contains features of at least one other CPS, possessing at least a predetermined number of the same characteristics as the current CPS. Thus, the system 201 will be able to more accurately teach the forecasting model and determine the error threshold using the data of several CPSs possessing the very same characteristics.

In one particular exemplary aspect, an exponential smoothing is applied to the total forecast error. This is to decrease the value of an error of the first kind.

In a particular exemplary aspect, the forecasting model is a neural net. In yet another particular exemplary aspect, the forecasting model comprises a set of models, that is, an ensemble, making a decision by averaging the results of the working of the individual models of the set. In yet another particular exemplary aspect, the neural net is optimized with the use of genetic algorithms. In another particular exemplary aspect, the neural net is selected with the use of one of the quality metrics: the NAB metric, the F1 metric.

In yet another particular exemplary aspect, weighting factors are used when computing the total forecast error for the errors of each feature of the CPS, wherein the value of the weighting factor of the feature is defined by how accurately the values of the given feature of the CPS can be forecast (for example, from previous forecasting results of the model). In this case, the forecast error may be considered to be a weighted error with defined weighting factors.

In a particular exemplary aspect, the technical documentation of the CPS is used when generating the training sample (a priori information describing possible states and technical characteristics of the sensors and actuators). This will make it possible to construct a model of higher quality by using the technical documentation of the CPS to attune the parameters of the model (the selecting of weighting factors when computing the total forecast error, the selection of the period of observation, the changing of the total error threshold, etc.).

In another particular exemplary aspect, a report from the user (also the operator, the user's report is a posteriori information) may be used to improve the quality of the model or to construct a new model in future by using the user's report to attune the parameters of the model.

The value of the weighting factor of the feature may be assigned by the training means 211 in dependence on the significance of that feature and on the basis of the technical documentation of the CPS or the user's report. For example, if a particular sensor often malfunctions or provides wrong readings, it may be assigned a low value of weighting factor or none at all, so that its readings will not affect the forecasting model or the value of the error threshold for determining an anomaly in the CPS.

In a particular exemplary aspect, the training means 211 is used to construct a registry of CPS features with the use of technical documentation of the CPS or the user's report, the registry containing in particular a description of the feature, the physical dimensionality of the feature, whether the feature describes a physical quantity of the object of the CPS, the rated measurement precision of the feature, the weighting factor of the feature and the designation of the object which is described by that feature. The forecasting model is constructed in view of the registry of CPS features, using it to attune the parameters of the model.

In another particular exemplary aspect, when constructing the training sample the period of observation does not include the values of the CPS features at moments of time when it is known that the values of the CPS features are anomalous, especially periods of time when startup/setup or diagnostic work is being done on the CPS and periods of time with manual control of the CPS.

In a particular exemplary aspect, the construction of the forecasting model by the training means 211 is done as follows. At first, an architectural template of the neural net is chosen. For example, a multilayered perceptron, a convolutional neural net, a recurrent neural net, or others. Next, a description of the selected architecture is generated:
    an optimizer and its parameters;
    the initial values of the weighting factors and the shifts;
    a maximum number of layers;
    for each layer:
        a list of possible types of layer, consisting of at least a subset of the following layers: dense, convolutional, GRU, LSTM, dropout;
        an activation function: linear, ReLU, Tan h, sigmoid, Softmax and others;
        a possible dimension of the layer (the number of neurons in the layer).

After this, the architecture of the neural net is optimized with the use of the optimizer. In a particular exemplary aspect, the optimization of the architecture of the neural net is done with the use of genetic algorithms. A quality metric is also used to select the best architecture. In a particular exemplary aspect, one of the following quality metrics is used: the NAB metric, the F1 metric.

Figure 3:
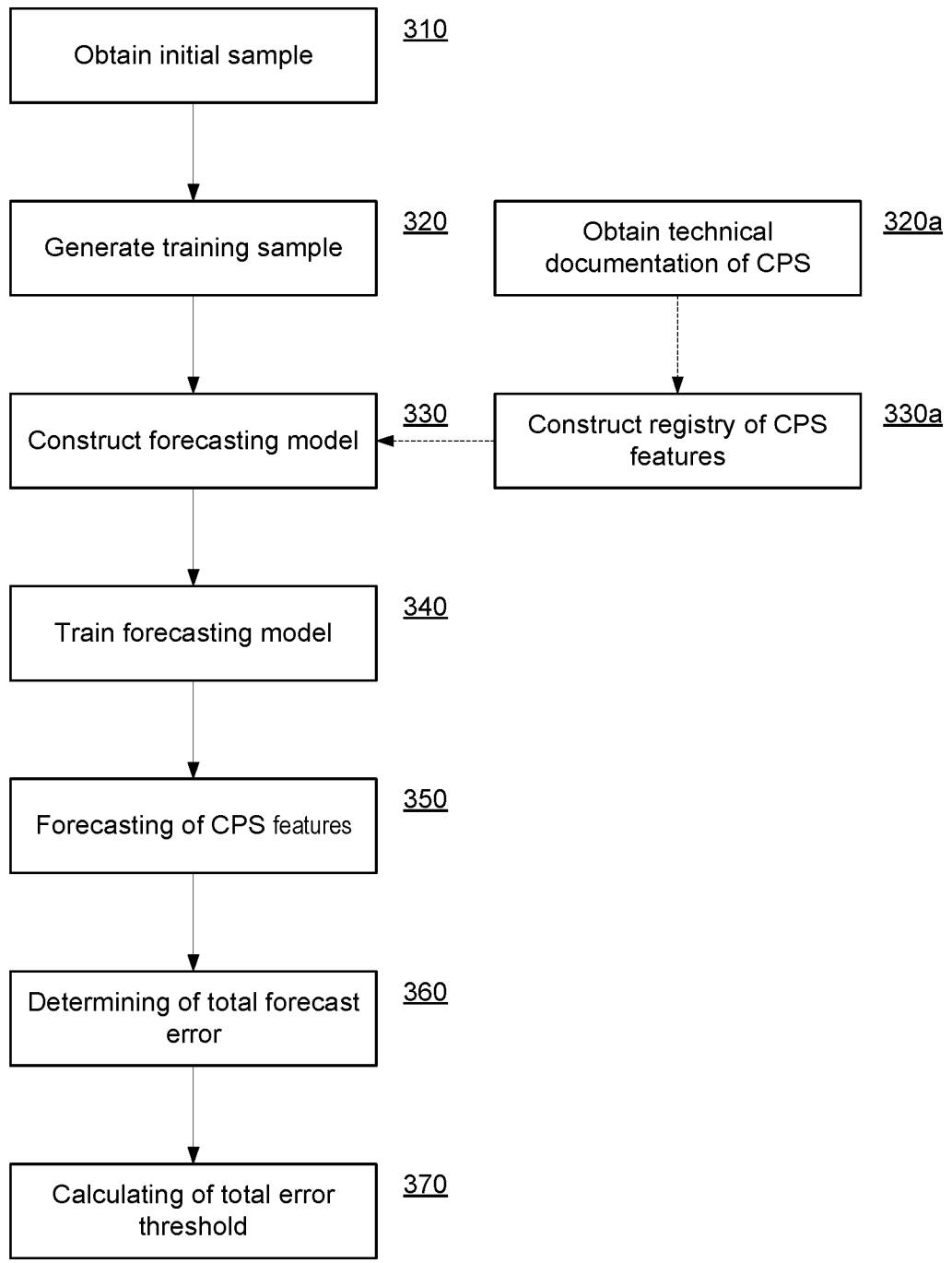
FIG. 3 presents a method of training the model for forecasting the values of the features of the CPS and calculating the error threshold for the determination of an anomaly in the CPS possessing the defined characteristics according to exemplary aspects of the present disclosure.

FIG. 3 presents a method of training the model for forecasting of values of the features of a cyber-physical system (CPS) and calculating the error threshold for the determination of an anomaly in a CPS possessing defined characteristics. In step 310, the initial sample is obtained, containing the values of the features of the CPS for a historical period of observation of the CPS. In a particular exemplary aspect, the percentage of anomalies in the initial sample does not exceed a given value. Then, in step 320, based on the initial sample and considering the characteristics of the CPS, a training sample is generated, including the values of at least one of the mentioned features of the CPS for a period of observation not greater than the historical period of observation. In a particular exemplary aspect, the training sample includes at least one moment of time when an anomaly has occurred. In step 330, the model is constructed for forecasting the values of the features of the CPS at each moment of time of the forecast window based on the data of the values of those features of the CPS at each moment of the input window, where the input window and the forecast window are situated within the period of observation and are chosen in dependence on the characteristics of the CPS, while the distance between the input window and the forecast window is equal to the forecast horizon, which is chosen in dependence on the characteristics of the CPS. Next, in step 340, the forecasting model is taught with the data of the training sample.

In step 350, the taught forecasting model is used to predict the values of the features of the CPS at every moment of time of the period of observation. After this, in step 360, the total error is determined for the forecast obtained with the use of the constructed forecasting model at every moment of time of the period of observation. In step 370, the total error threshold is computed in dependence on the characteristics of the CPS, such that the exceeding of the computed threshold by the total forecast error signifies an anomaly in the CPS. It should be noted that the particular exemplary aspects disclosed above with regard to the system 201 represented in FIG. 2 are also applicable to the method described in FIG. 3. For example, in one of the particular exemplary aspects, in step 320a the technical documentation of the CPS or the user's report on previously detected anomalies is obtained. Next, in step 330a, the training means 211 is used to construct a registry of features of the CPS using the technical documentation of the CPS or the user's report, where the registry contains in particular a description of the feature, the physical dimensionality of the feature, whether the feature describes a physical quantity of the object of the CPS, the rated measurement precision of the feature, the weighting factor of the feature and the designation of the object which is described by that feature, the forecasting model being constructed (step 330) in view of the registry of CPS features. Other particular exemplary aspects have been enumerated above, in FIG. 2.

FIG. 4 presents a system for determining the source of an anomaly in a cyber-physical system. The system for determining the source of an anomaly 220 contains a forecasting means 221 and an anomaly determination means 222. The forecasting means 221 is designed to obtain the values of the features of the CPS for the input window, which is determined by the taught forecasting model, and it also performs a forecasting of the values of the features of the CPS for the forecast window using the taught forecasting model and based on the data of the obtained values of the CPS features for the input window. The features of the CPS are numerical characteristics of the sensors, actuators, and PID controllers. The input window and the forecast window are intervals of time specified in the taught forecasting model, where the input window contains the values of the features whose values are used to forecast the values of the features for the forecast window. That is, they are determined by the system and the method as described in FIG. 2-3. The input window and the forecast window are situated within the period of observation and are chosen in accordance with the characteristics of the CPS. The distance between the input window and the forecast window is the horizon of the forecast (for example, from the end of the input window to the start of the forecast window), which also depends on the characteristics of the CPS. The forecast horizon may take on both non-negative values (a forecast for the future) and negative values. In a particular exemplary aspect, the input window and the forecast window may intersect each other (the forecast horizon is negative). In another particular exemplary aspect, the input window and the forecast window do not intersect each other (the forecast horizon is positive).

The anomaly determination means 222 is designed to determine the total forecast error for the features of the CPS for the forecast window, to determine an anomaly in the CPS if the total forecast error is greater than the total error threshold (that is, the threshold value of the total error), and also to determine at least one feature of the CPS which is the source of the anomaly if the contribution of the forecast error of that at least one feature of the CPS (among all features of the CPS on the mentioned list of features) to the total forecast error is greater than the contribution of other features of the CPS (among all features of the CPS on the mentioned list of features) to the total forecast error. For example, 5 features of the CPS are determined with the largest forecast error among all the features of the CPS on the mentioned list of features. In a particular exemplary aspect, the total error threshold is a quantile of specified accuracy of the total forecast error, such as one on a level of significance of 99%.

In a particular exemplary aspect, the values of the features of the CPS arrive in real time mode, and therefore the total forecast error for the forecast window is determined after a time equal to the sum of the forecast horizon and the input window, that is, when the real values of the features of the CPS will have been obtained for every moment of time of the forecast window.

In another particular instance, if the values of the features of the CPS are contained in the initial sample for a historical period of observation (that is, for the entire period of time during which the observation was conducted), the total forecast error for the forecast window is determined from the data of the initial sample for the historical period of observation.

In a particular exemplary aspect, the features of the CPS include at least one of: the measurement of a sensor (a technological parameter of the sensor); a controllable parameter of an actuator; a setpoint of an actuator; the input signals or the output signal of a PID controller.

In a particular exemplary aspect, the cyber-physical system has at least one of the following characteristics:
- the branch of industry in which the cyber-physical system is functioning;
- the types of processes described by the parameters of the CPS, in particular, one of: continuous, conveyor type, cyclical;
- the presence of seasonality and/or trends in the features of the CPS;
- the inertness of the processes of the CPS;
- the response time of the CPS to changes occurring in the CPS and in the surroundings;
- the danger level of the production for the workers and the ecology;
- the cost of a standstill of the technological processes due to abnormal situations;
- the type of control, in particular, whether performed with the use of PID controllers, finite automata, or a combined method;
- the type of the subject of control, characterized by at least one feature, the type of the subject of control being one of: a sensor, an actuator, or a PID controller;
- the self-diagnostic data of the CPS;
- the serviceability status of the subject of control;
- the relationship of the subjects of control at the level of the technical process.

In a particular exemplary aspect, the forecasting model is a neural net. In yet another particular exemplary aspect, the forecasting model comprises a set of models, that is, an ensemble, making a decision by averaging the results of the working of the individual models of the set. In yet another particular exemplary aspect, the neural net is optimized with the use of genetic algorithms. In another particular exemplary aspect, the neural net is selected with the use of one of the quality metrics: the NAB metric, the F1 metric.

In yet another particular exemplary aspect, weighting factors are used when computing the total forecast error for the errors of each feature of the CPS, wherein:
- a low value is assigned to the weighting factor for an feature if the subject of control characterized by that feature provides data with noise or invalid data or is periodically disconnected by the user of the CPS;
- a low value is assigned to the weighting factor for an feature in which the occurrence of an anomaly does not influence the working of the CPS, and a high value is assigned to the weighting factor for an feature in which the occurrence of an anomaly influences the working of the CPS.

In one particular exemplary aspect, an exponential smoothing is applied to the total forecast error. This is to decrease an error of the first kind.

In yet another particular exemplary aspect, weighting factors are used when computing the total forecast error for the errors of each feature of the CPS, wherein the value of the weighting factor of the feature is defined by how accurately the values of the given feature of the CPS can be forecast. In this case, the forecast error may be considered to be a weighted error with defined weighting factors.

In yet another particular exemplary aspect, the technical documentation of the CPS or a user's report on anomalies previously detected by the taught system is obtained, the weighting factor for the feature being chosen with the aid of the training means 211 in dependence on the significance of that feature and on the basis of the technical documentation of the CPS or the user's report.

FIG. 5 presents an example of a method of determining the source of an anomaly in a cyber-physical system possessing defined characteristics. In step 510 the values of the features of the CPS are obtained for the input window, which is determined by the taught forecasting model (as used in the system and method presented in FIG. 3-4). Next, in step 520, the taught forecasting model and the data of the obtained values of the features of the CPS for the input window are used to make a forecast of the values of the features of the CPS for the forecast window. After this, in step 530, the total forecast error for the features of the CPS is determined for the forecast window, and if the total forecast error exceeds the total error threshold in step 540 an anomaly is determined in the CPS. As a result, in step 550 at least one feature of the CPS is determined as the source of the anomaly if the contribution of the forecast error of that at least one feature of the CPS to the total forecast error is greater than the contribution of other features of the CPS to the total forecast error. For example, 5 features of the CPS are determined with the largest forecast error among all features of the CPS on the mentioned list of features.

In a particular exemplary aspect, the values of the features of the CPS arrive in real time mode, and therefore the total forecast error for the forecast window is determined after a time equal to the sum of the forecast horizon and the input window, that is, when the real values of the features of the CPS will have been obtained for every moment of time of the forecast window.

In another particular instance, if the values of the features of the CPS are contained in the initial sample for a historical period of observation, the total forecast error for the forecast window is determined from the data of the initial sample for the historical period of observation.

In a particular exemplary aspect, the features of the CPS include at least one of: the measurement of a sensor (a technological parameter of the sensor); a controllable parameter of an actuator; a setpoint of an actuator; the input signals or the output signal of a PID controller.

In a particular exemplary aspect, the cyber-physical system has at least one of the following characteristics:
- the branch of industry in which the cyber-physical system is functioning;
- the types of processes described by the parameters of the CPS, in particular, one of: continuous, conveyor type, cyclical;

the presence of seasonality and/or trends in the features of the CPS;

the inertness of the processes of the CPS;

the response time of the CPS to changes occurring in the CPS and in the surroundings;

the danger level of the production for the workers and the ecology;

the cost of a standstill of the technological processes due to abnormal situations;

the type of control, in particular, whether performed with the use of PID controllers, finite automata, or a combined method;

the type of the subject of control, characterized by at least one feature, the type of the subject of control being one of: a sensor, an actuator, or a PID controller;

the self-diagnostic data of the CPS;

the serviceability status of the subject of control;

the relationship of the subjects of control at the level of the technical process.

In a particular exemplary aspect, the forecasting model is a neural net. In yet another particular exemplary aspect, the forecasting model comprises a set of models, that is, an ensemble, making a decision by averaging the results of the working of the individual models of the set. In yet another particular exemplary aspect, the neural net is optimized with the use of genetic algorithms. In another particular exemplary aspect, the neural net is selected with the use of one of the quality metrics: the NAB metric, the F1 metric.

In yet another particular exemplary aspect, weighting factors are used when computing the total forecast error for the errors of each feature of the CPS, wherein:

a low value is assigned to the weighting factor for an feature if the subject of control characterized by that feature provides data with noise or invalid data or is periodically disconnected by the user of the CPS;

a low value is assigned to the weighting factor for an feature in which the occurrence of an anomaly does not influence the working of the CPS, and a high value is assigned to the weighting factor for an feature in which the occurrence of an anomaly influences the working of the CPS.

In one particular exemplary aspect, an exponential smoothing is applied to the total forecast error. This is to decrease an error of the first kind.

In one particular exemplary aspect, weighting factors are used when computing the total forecast error for the errors of each feature of the CPS, wherein the value of the weighting factor of the feature is defined by how accurately the values of the given feature of the CPS can be forecast. In this case, the forecast error may be considered to be an error weighted with defined weighting factors.

In yet another particular exemplary aspect, the technical documentation of the CPS or a user's report on anomalies previously detected by the taught system is obtained, the weighting factor for the feature being chosen with the aid of the training means 211 in dependence on the significance of that feature and on the basis of the technical documentation of the CPS or the user's report.

Below is an example of the working of the described systems and methods of FIG. 2-5. After obtaining the initial sample, containing the values of the features of the CPS for the historical period of observation of the CPS-$T_0$, the training sample is generated—for the period of observation $T_1 \subseteq T_0$ (that is, the period of observation $T_1$ is a subset of $T_0$). The training sample consists of m features of the CPS at each moment of time of observation $x_t$ (a vector of values of the CPS features) of the observation period $T_1$:

$x_t = (x_t^1, \ldots, x_t^m)$, where $t \geq 0$ is the time, and $m > 0$ is the number of features.

The input window of time for said features is L (such that the length of the window is positive), h is the forecast horizon, $\tilde{L}$ is the forecast window (such that the length of the window is positive), i.e., the period of time for which the values of the features are forecast based on the data of the values of the features for the period of time L. Here, L, $\tilde{L} \subseteq T_1$.

Figure 6:
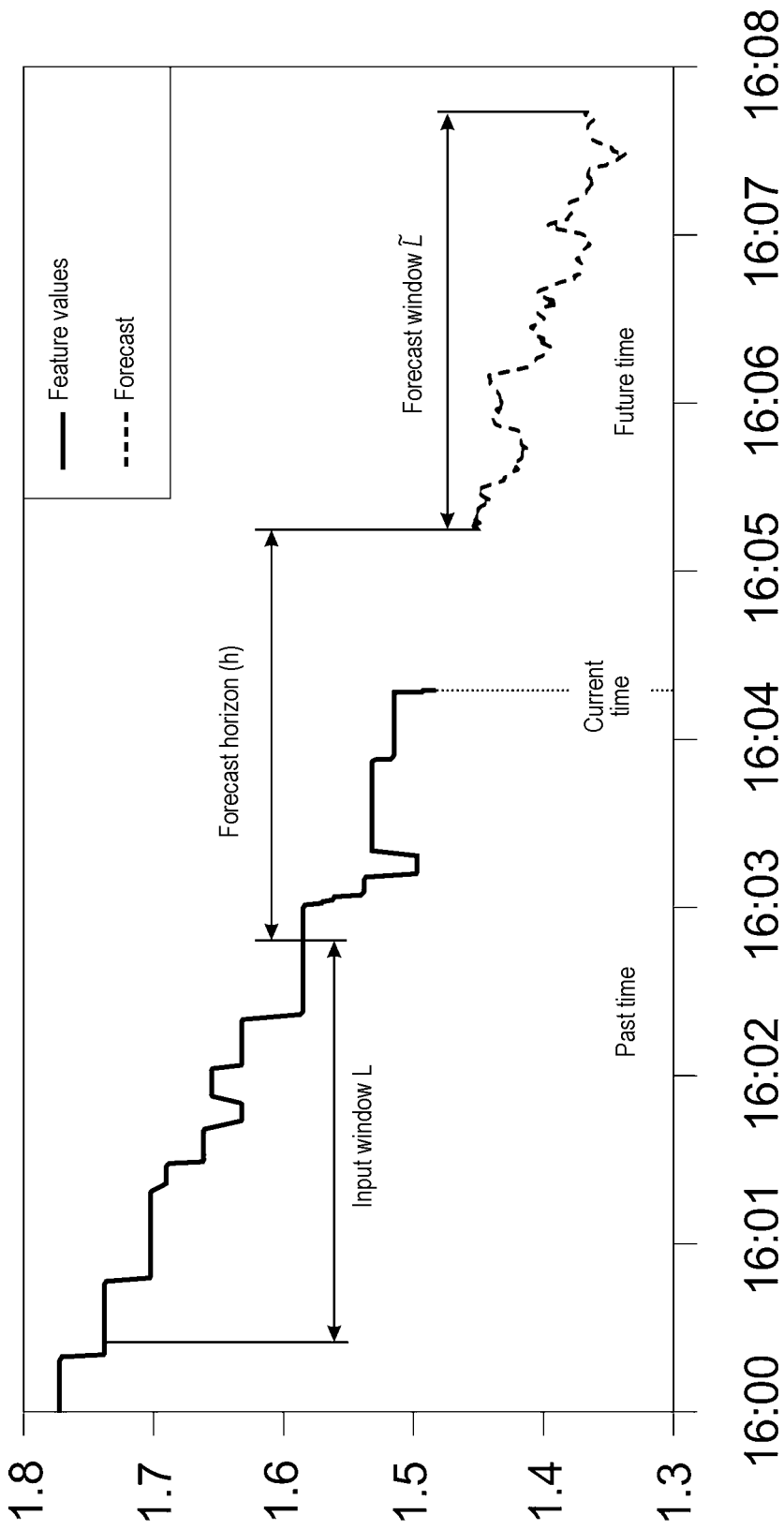
FIG. 6 presents an example of the time function of the values of one feature, also indicating the input window, the forecast window, and the forecast horizon.

FIG. 6 shows an example of the time function of the values of one feature, also designating the input window L, the forecast window $\tilde{L}$ and the forecast horizon h. In the general case, the input window L and the forecast window $\tilde{L}$ may either intersect or not intersect each other. As regards the example presented, in the following we shall discuss the working of the system and method of training the model for the forecasting of the values of the features of a CPS and calculating the error threshold R to determine an anomaly, possessing the defined characteristics of the CPS per FIG. 2-3. The training sample, generated on the basis of the initial sample and taking into account the characteristics of the CPS, includes the values of the features of the CPS for a period of observation (for example, the entire interval from 16:00 to 16:08). Using the training sample, a model is constructed for the forecasting of the values of the CPS features at every moment of time of the forecast window $\tilde{L}$ from the data of the values of the CPS parameters at every moment of time of the input window L. The input window L and the forecast window $\tilde{L}$ are within the period of observation and are chosen in dependence on the characteristics of the CPS. The forecast horizon h is also chosen in dependence on the characteristics of the CPS. The forecast values of the features are calculated by the formula:

$$\{\tilde{x}_t\}_{t \in \tilde{L}} = F(\{x_t\}_{t \in L}), \text{ where}$$

$F(\bullet)$ is the forecasting model.

The training of the forecasting model is done with the data of the entire training sample. After this, a forecast is made for the values of the CPS features at every moment of time of the observation period. This may be done by shifting the input window and the forecast horizon such that forecast values for the CPS features are ultimately obtained at every moment of time of the observation period. After this, the total forecast error is determined for the parameters of the CPS at every moment of time of the forecast window. In a particular exemplary aspect, the total forecast error at time t is the mean error:

$$M_t^p = \frac{1}{m} \sum_{j=1}^{m} |x_t^j - \tilde{x}_t^j|^p,$$

where $p > 0$.

The difference $|x_t^j - \tilde{x}_t^j|^p$ may be defined as the forecast error of the feature with number $j = \overline{1,m}$ at time $t \geq 0$. In yet another particular exemplary aspect, the total forecast error threshold R may be calculated as a quantile of given accuracy of the total forecast error $\{M_t^p\}_t$ (for example, a quantile in the order of 0.95). Thus, an anomaly occurs when $\{M_t^p\}_t > T$. Moreover, an exponential smoothing may be applied to the total forecast error.

In regard to the example presented, we shall further discuss the working of the system and method for determining the source of an anomaly in a CPS possessing certain characteristics per FIG. 4-5. Depending on the exemplary aspect, the values of the features of the CPS arrive either in real time mode for the determination of the source of an anomaly in the CPS at the current moment of time, or for a historical period of observation for a retrospective determination of the source of an anomaly in the CPS. As an illustration, we shall now discuss an exemplary aspect in which the values of the features of the CPS arrive in real time mode. Thus, the values of the features of the CPS arrive during the input window L (which is determined by the taught forecasting model, see FIG. 2-3). After this, using the taught forecasting model and the data of the obtained values of the features of the CPS during the input window L, a forecast is made for the values of the features of the CPS for the forecast window $\hat{L}$. The total forecast error for the features of the CPS is determined for the forecast window, and if the total forecast error exceeds the total error threshold an anomaly is determined in the CPS. After this, at least one CPS feature is determined that is the source of the anomaly if the contribution of this CPS feature to the total forecast error is greater than the contribution of other CPS features to the total forecast error.

Figure 7:
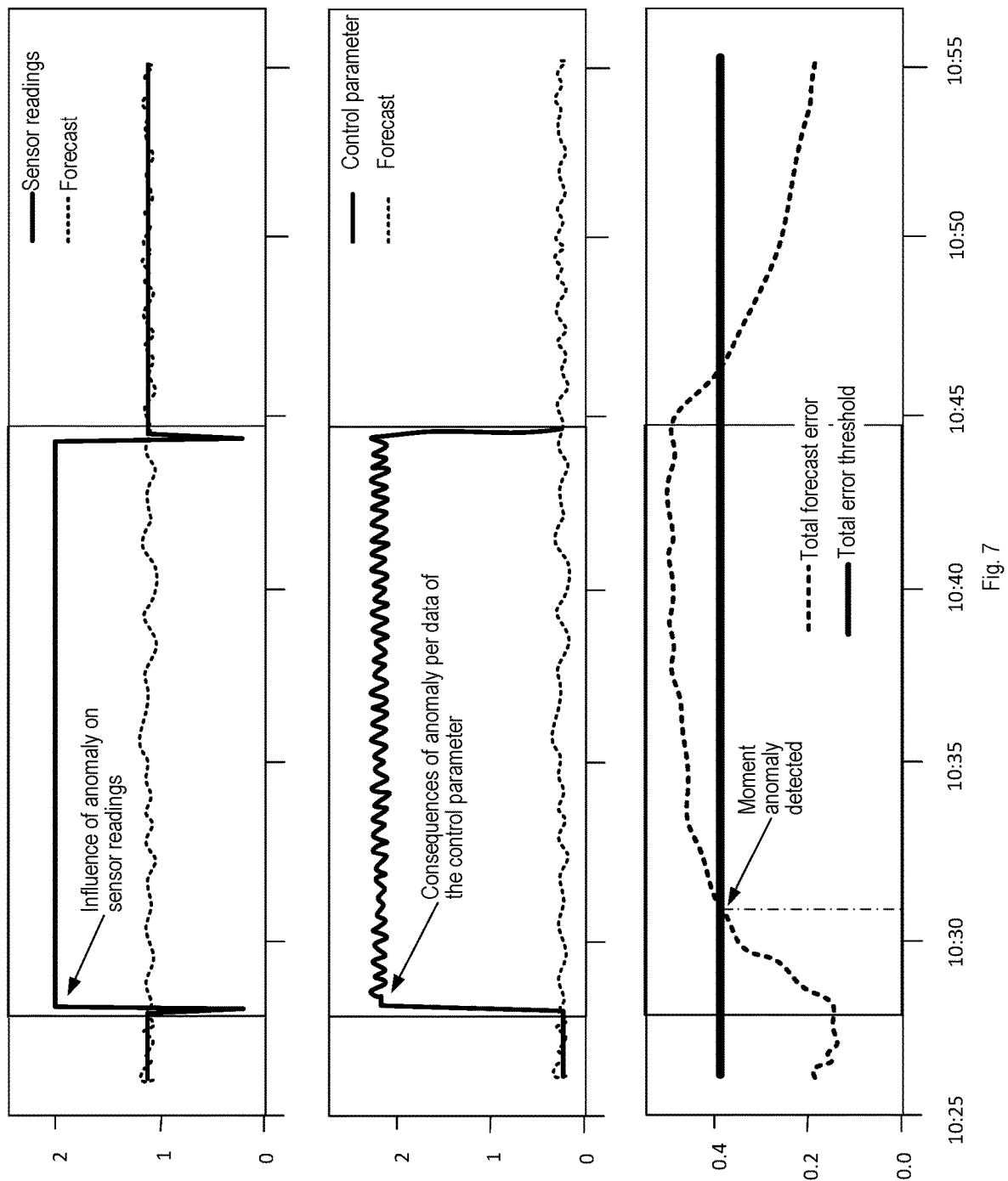
FIG. 7 presents examples of the time functions of the values of features, the values of forecasts of features, and the total forecast error in the vicinity of the moment of occurrence of an anomaly.

FIG. 7 presents examples of the time functions of the values of the features, the values of the forecasts of the features, and the total forecast error in the vicinity of the moment of occurrence of an anomaly. The first two graphs represent the dynamics of change in the values of the features, i.e., the real values obtained from the corresponding subjects of control (the sensors, actuators, and PID controllers), as well as the dynamics of their forecast values obtained with the use of the systems and methods described in FIG. 2-5. The lower graph presents the dynamics of the total forecast error (for both features) and the moment when it exceeds the total error threshold, which signifies the occurrence of an anomaly.

In one particular exemplary aspect, an exponential smoothing is applied to the total forecast error. This is to decrease an error of the first kind.

Figure 8:
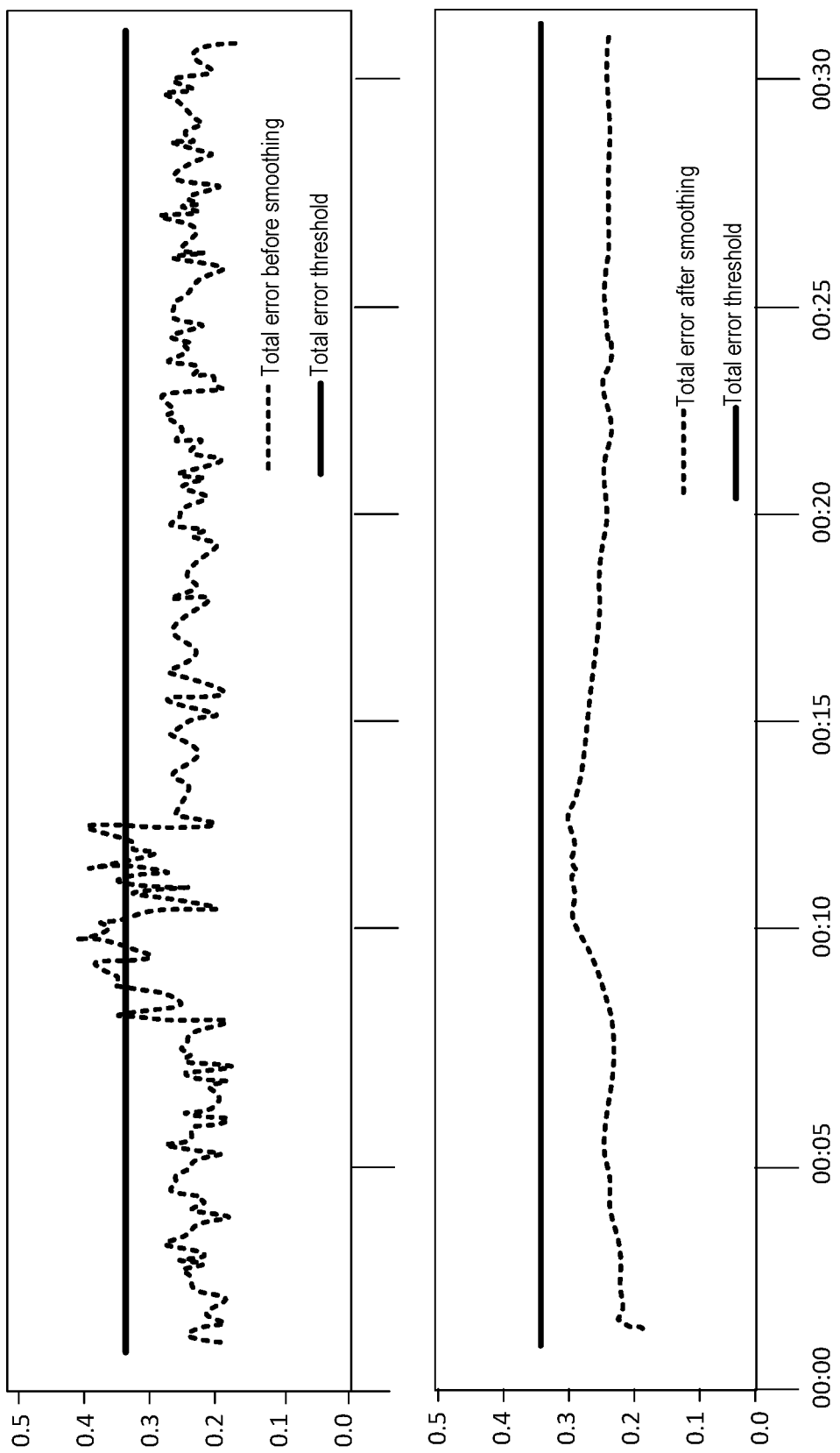
FIG. 8 presents an example of the dynamics of the total forecast error before and after a smoothing.

FIG. 8 presents an example of the dynamics of the total forecast error before and after a smoothing. It is evident from the graph that, in the first case, with the use of the system and method per FIG. 4-5 the anomaly determination means 222 would have determined an anomaly due to the total error surpassing the total error threshold, while in the second case no anomaly is determined, which is more consistent with the reality in view of the reduction in transient deviations of the error. That is, the smoothing of the total forecast error allows a decreasing of the likelihood of repeat determination of the same anomaly, as well as the noise in that error. After detecting the anomaly, the features of the CPS, which are the source of the anomaly, with the largest contribution to the total forecast error are determined.

In a particular exemplary aspect, the mean error of degree p>0 (for example, the mean squared error) may be used as the total forecast error. In yet another particular exemplary aspect, the total forecast error may be the weighted mean error of degree p.

In a particular exemplary aspect, in the system and method described in FIG. 4-5, the user (operator) of the CPS may be shown accompanying information about the detected anomaly when determining an anomaly. For example, graphs of the change in values of the parameters during a period spanning the moment of detection of an anomaly. Furthermore, the graph may show the forecast values of the parameters, the total error threshold and the error threshold of the corresponding parameter, as well as an indication of the moment of detection of the anomaly and the parameters which are the sources of the anomaly. After further analysis, the user of the CPS may confirm or reject the detection of the anomaly and the parameters which are the source of the anomaly. This will allow a decreasing of an error of the first kind and an increasing of the accuracy of determination of anomalies and identification of parameters which are the source of the given anomaly. A system for generating data for the monitoring of a cyber-physical system for the purpose of an early determination of anomalies in a graphic user interface (GUI) system shall be presented below in greater detail in FIG. 9.

Figure 9:
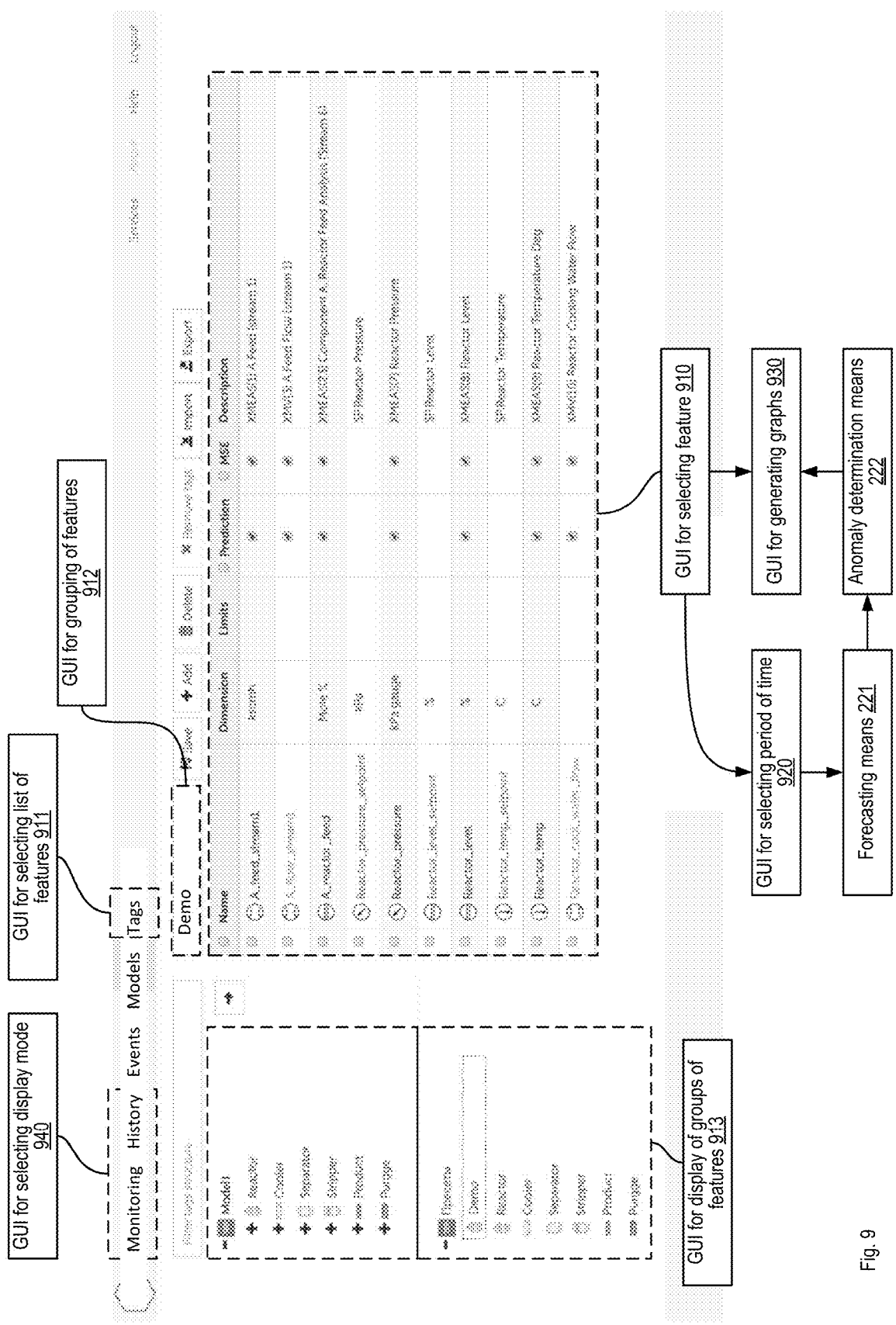
FIG. 9 presents a system for generating data for the monitoring of a cyber-physical system for the purpose of an early determination of anomalies in a graphic user interface (GUI) system containing a group of GUI elements according to exemplary aspects of the present disclosure.

FIG. 9 presents a system for generating data for the monitoring of a cyber-physical system for the purpose of an early determination of anomalies in a graphic user interface (GUI) system. The GUI system contains at least one GUI element for selecting an feature 910, the element containing, in particular, a list of features of the cyber-physical system (hereinafter, the list of features), and being designed to receive information about the at least one feature of the CPS from the list of features, which at least one feature was selected by the user (also the operator) of the CPS. The list of features is selected using a GUI for selecting a list of features 911. Furthermore, at least one GUI element for selecting a period of time 920 is designed to receive information about the period of time, selected by the user, for the monitoring of the selected features of the CPS. The system likewise contains a forecasting means 221, designed to generate a forecast for the features of the CPS for the indicated monitoring time period, and an anomaly determination means 222, designed to generate the total forecast error for the selected features of the CPS and the forecast error for each of the selected features of the CPS for the indicated monitoring time period. The forecasting means 221 and the anomaly determination means 222 may function in accordance with the above described system and method per FIG. 4-5 and in the corresponding particular variant aspects. Furthermore, the variant aspects described in FIG. 2-5 may also be applied to the GUI system.

At least one element of the GUI for generating graphs 930 is designed to generate for the values of the data generated by the forecasting means 221 and the anomaly determination means 222 for the indicated monitoring time period. In a particular exemplary aspect, said data values include in particular the following:

each selected feature of the CPS;
the forecast for each selected feature of the CPS;
the total forecast error for the features of the CPS;
the forecast errors for each selected feature of the CPS;
the threshold of the total forecast error.

In addition the anomaly determination means 222 is designed to determine an anomaly in the CPS when the total forecast error is greater than a total error threshold, and an element of the GUI for generating graphs 930 is additionally designed to generate data about the anomaly in the CPS and to generate a graph of values for at least one of all the features of the CPS (that is, from the above mentioned list of features) if the contribution of the forecast error of that at least one feature of the CPS to the total forecast error is greater than the contribution of at least one other feature of the CPS (also from among all the features of the CPS on the list of features) to the total forecast error.

Figure 10A:
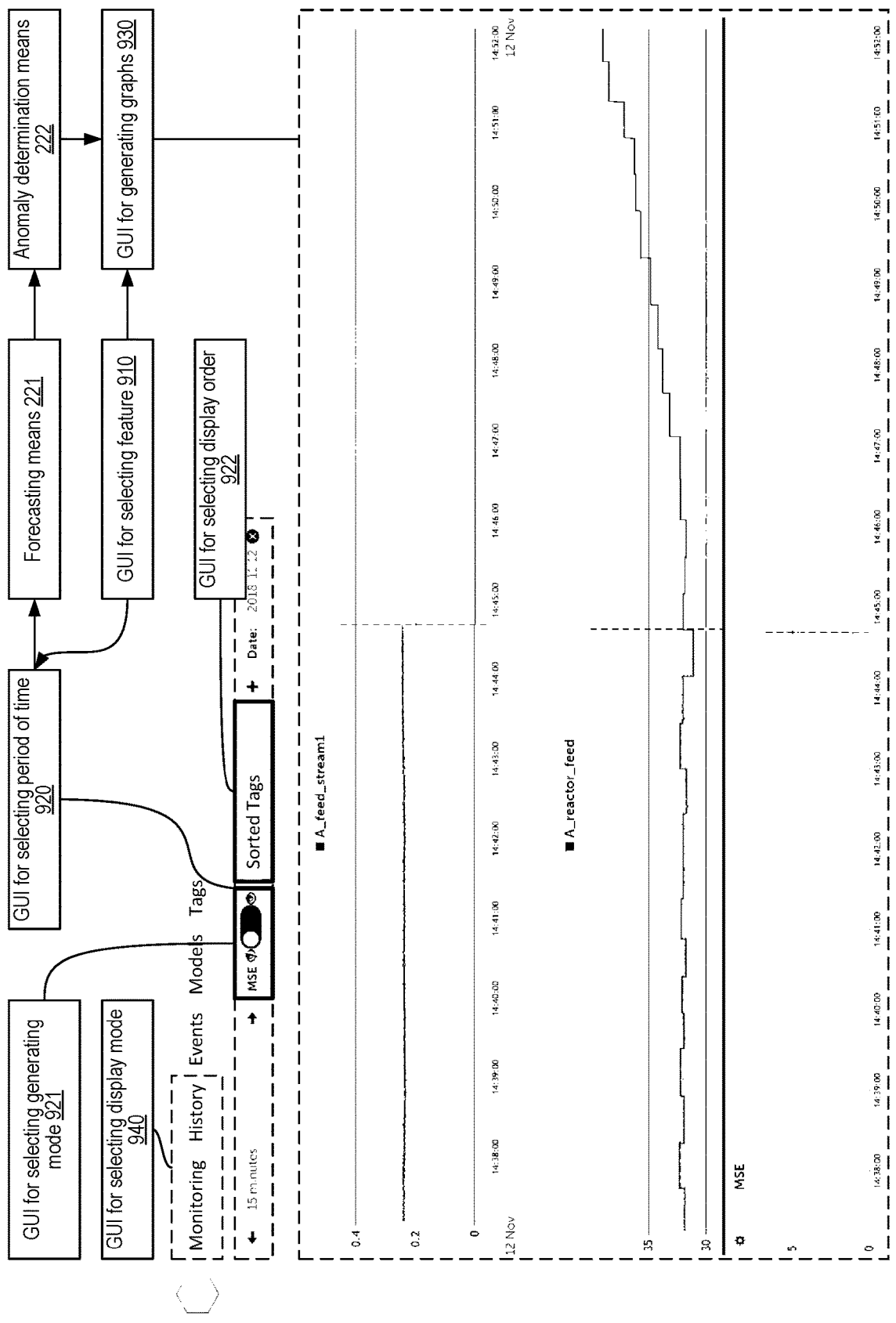
FIG. 10a-10c present a GUI element for selection of the display mode, a GUI element for generating the forecast error of an feature, and a GUI element for selection of the display order according to exemplary aspects of the present disclosure.
Figure 10B:
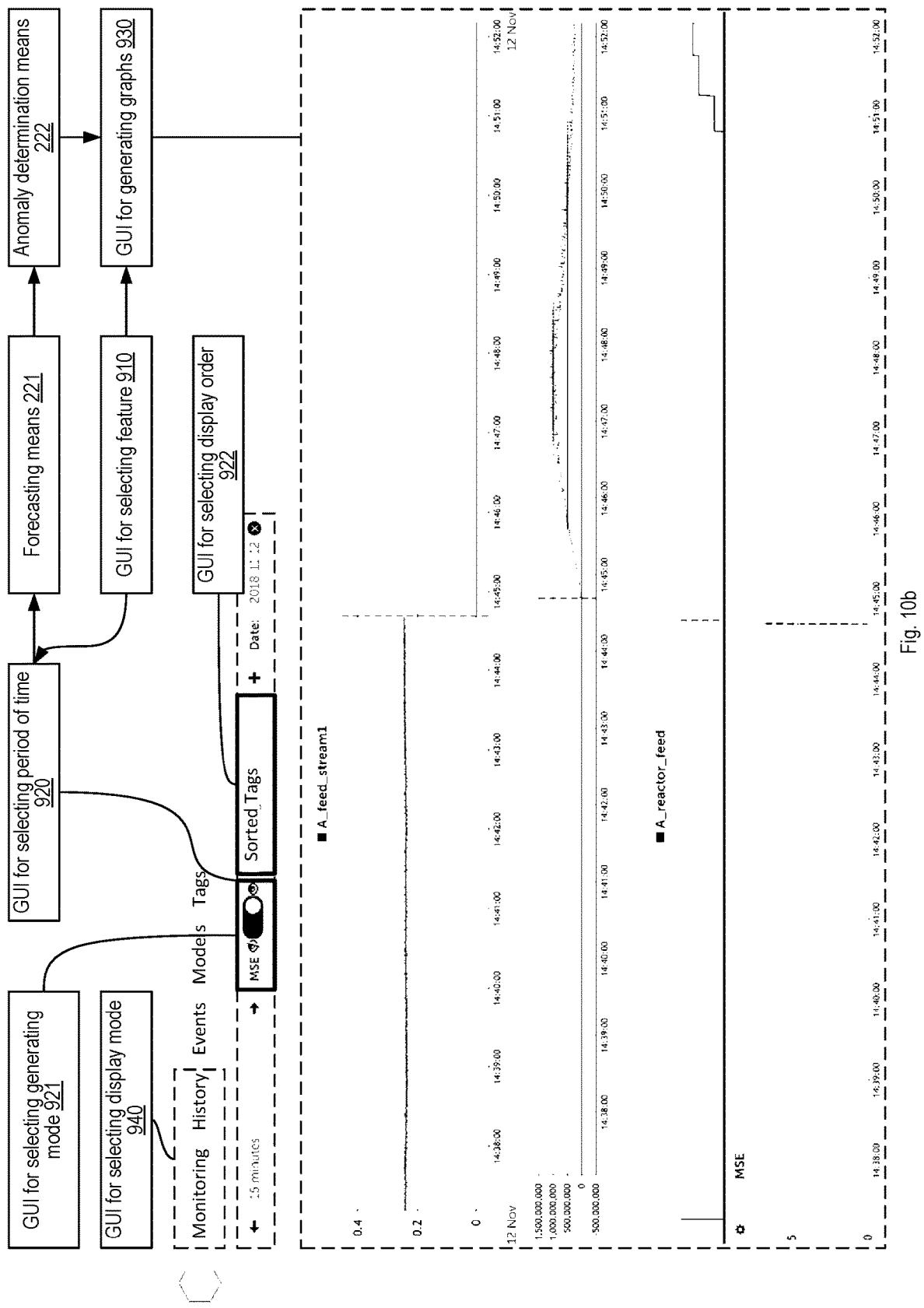

FIG. 9 and FIG. 10a-10b also present an illustrative example of the working of the described system. Specifically, with the use of a GUI element for the selection of an feature 910, the user selects features for which graphs are generated (constructed) with the use of the GUI for generating graphs 930 for the indicated monitoring time period 920.

For example, in FIG. 10a the two upper graphs are graphs of real values and forecast values for selected features ("A_feed_stream1" and "A_reactor_feed"). In the third, lower graph there is presented the total forecast error for all the features of the CPS (that is, calculated on the basis of the real and forecast values of all the features of the CPS on the mentioned list of features) and the threshold of the total forecast error (horizontal line). There is also shown the moment of occurrence of an anomaly in the CPS (the vertical dotted line at the center of each of the graphs), which is the moment of time when the total forecast error exceeds the threshold of the total error. That is, the total forecast error is composed of the forecast errors of the features, and so the forecast error of each feature may be slight, yet at the same time the total forecast error may exceed the total error threshold, and as a result an anomaly will occur. Therefore, it is problematical for the user of the CPS to detect such an anomaly. However, using the system proposed in FIG. 9 allows this process to be simplified, namely, to determine the moment of occurrence of an anomaly and to generate graphs of the values of the features of the CPS and of the forecast values of those features (and then providing them to the user). These graphs, generated by the GUI for generating graphs 930, may be generated (and displayed to the user) both for features selected by the user and for features (from among all features of the CPS) on the mentioned list of features having the largest forecast error (that is, the contribution to the total forecast error of these features is greater than the contribution of other selected features). These are precisely the features which are the most likely sources of an anomaly.

Figure 10C:
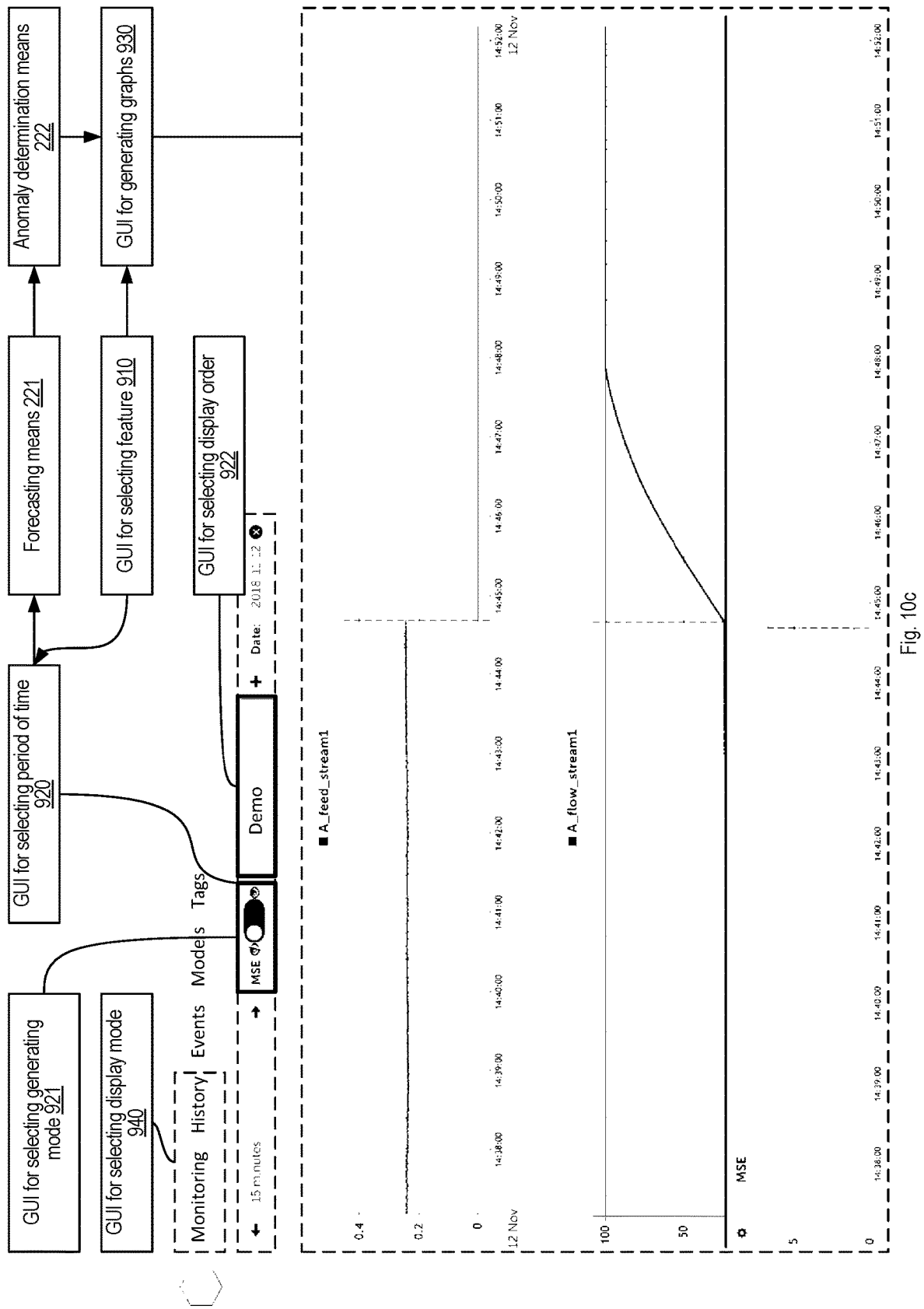

In a particular exemplary aspect, the GUI system described in FIG. 9 additionally contains a GUI element for selection of the display mode 940, designed to receive information about the mode, selected by the user, of monitoring the selected features of the CPS: real-time mode or coding/decoding mode, wherein if real-time mode is selected, then the mentioned element of the GUI for generating graphs 930 generates graphs of those values at the current moment of time (see FIG. 10a-10c).

The described system also contains a GUI element for generating the forecast error of an feature 921, which element is designed to receive information about the mode, selected by the user, of generating or not generating the forecast error for the selected features of the CPS in the GUI element for generating graphs 930. In the given example, this is the mean squared error (MSE). For example, in FIG. 10a and FIG. 10c, the displaying of the forecast error of the feature is not selected. At the same time, in FIG. 10b a displaying of the forecast error of the feature has been selected, as a result of which the graph for the forecast error of this feature is displayed in the GUI element for generating graphs 930 after the graph for each feature. For example, the first graph is for the feature "A_feed_stream1" and the second graph contains the forecast error of this feature. The lowest graph displays the total forecast error for the features.

The GUI element for selection of the order of display 922 is designed to receive information about the method, selected by the user, of sorting and displaying the selected features on the element of the GUI for generating graphs 930. For example, a sorting mode may be selected (sorted tags, selected in FIG. 10a-10b), where the graphs of the values of the features will be sorted by largest forecast error—from the largest forecast error for the feature in the first graph to the smallest forecast error for the feature in the last graph. This display mode may be the default display mode. It also allows the system to automatically generate and present to the user of the CPS information on the most likely site of occurrence of an anomaly and disruption of the TP. It is also possible to select a display mode in the order in which selected features are present in the previously mentioned list of features of the CPS (selected in FIG. 10c).

Figure 12:
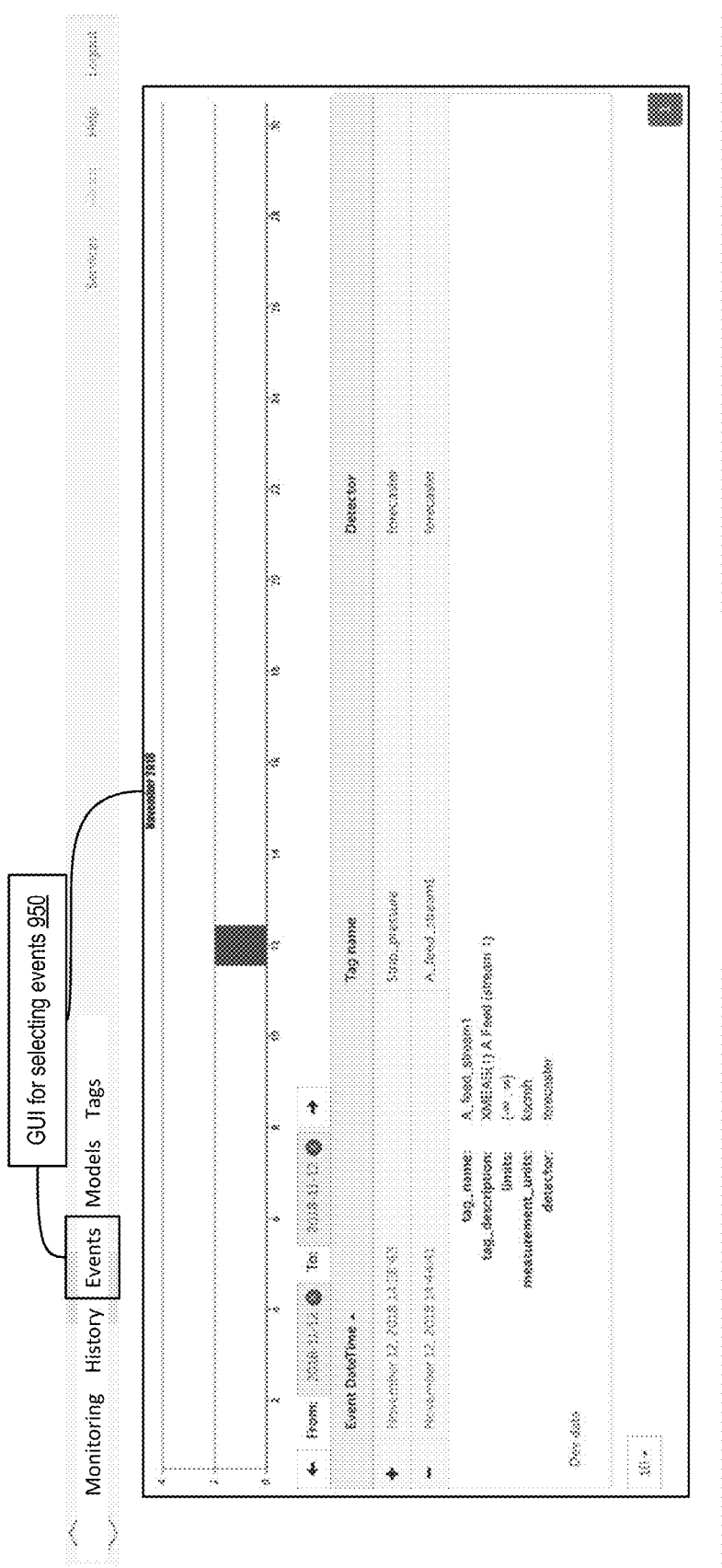
FIG. 12 presents a GUI element for selection of events according to exemplary aspects of the present disclosure.

In another particular exemplary aspect, the GUI system additionally contains at least one GUI element for selection of events 950 (see FIG. 12), which is designed to generate a list of events of the CPS in which an anomaly occurred and, upon one of these events being selected by the user, the mentioned at least one GUI element for selection of events 950 is designed to generate for the selected event a graph of the values of the mentioned data at the time of occurrence of the anomaly and for the indicated monitoring time period.

In one particular exemplary aspect, said list 910 for each of the features of the CPS additionally contains:
   an identifier of the feature;
   a description of the feature;
   the forecast errors for the feature;
   the observable value of the feature;
   the predicted value of the feature;
   the units of measurement of the feature;
   the permissible limits of change of the feature;
   the link of the feature to the equipment (PLC and others).

Figure 11A:
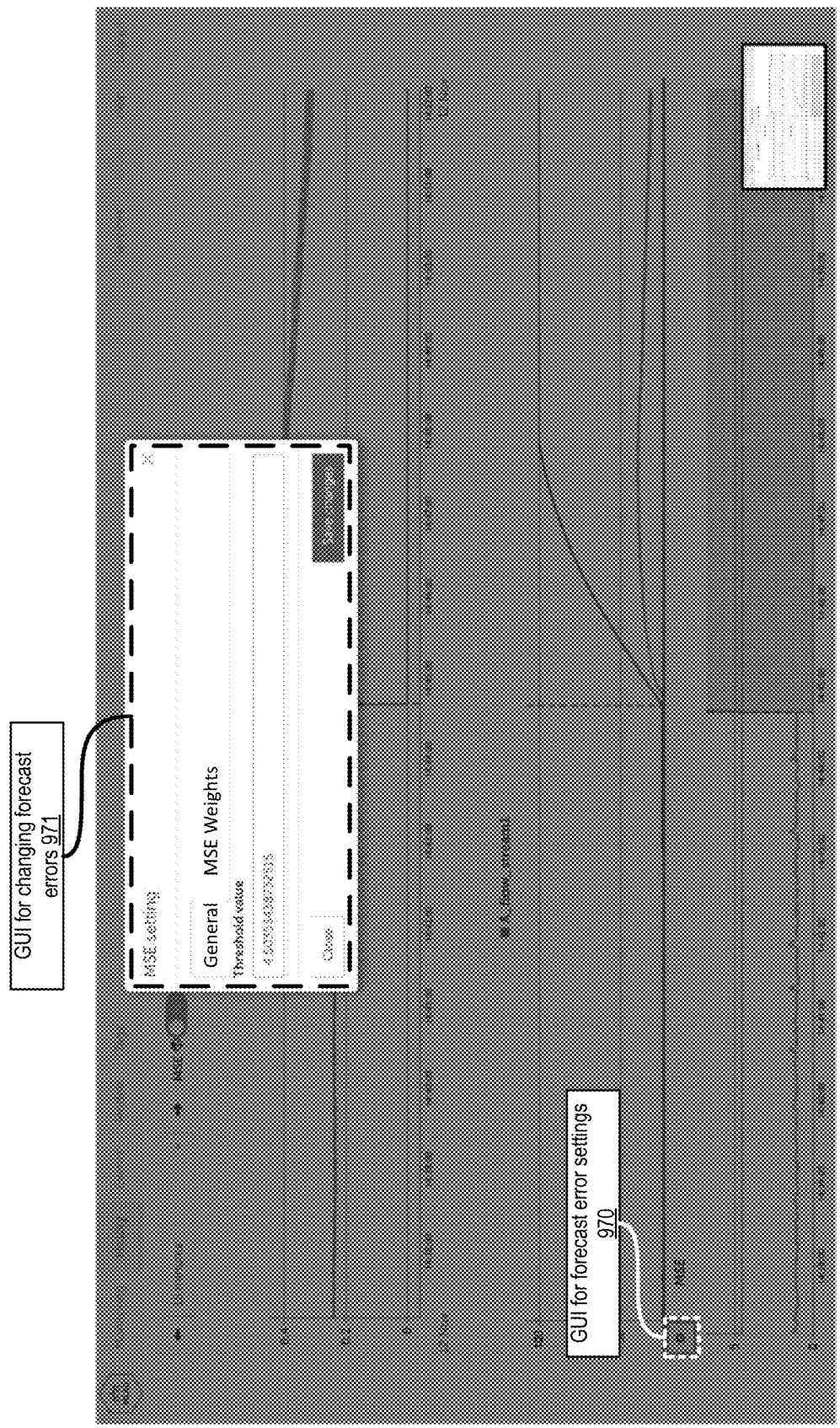
FIG. 11a presents a GUI element for forecast error settings according to exemplary aspects of the present disclosure.

FIG. 11a presents a GUI element for the settings of the forecast errors 970, which is designed to receive information on the selection by the user for the display of a GUI for changing the forecast errors 971, which in turn serves for displaying the current value of the threshold of the total forecast error and is designed to receive information about changes made by the user in the values of the mentioned threshold of the total forecast error. As a result, the GUI for changing the forecast errors 971 will change the value of the mentioned threshold of the total forecast error. For example, the user may raise the threshold of the total forecast error when there is a large number of false alarms. Obviously, the altered value of the threshold of the total forecast error will also entail corresponding changes in the determination of an anomaly in the CPS (in FIG. 4-FIG. 5).

Figure 11B:
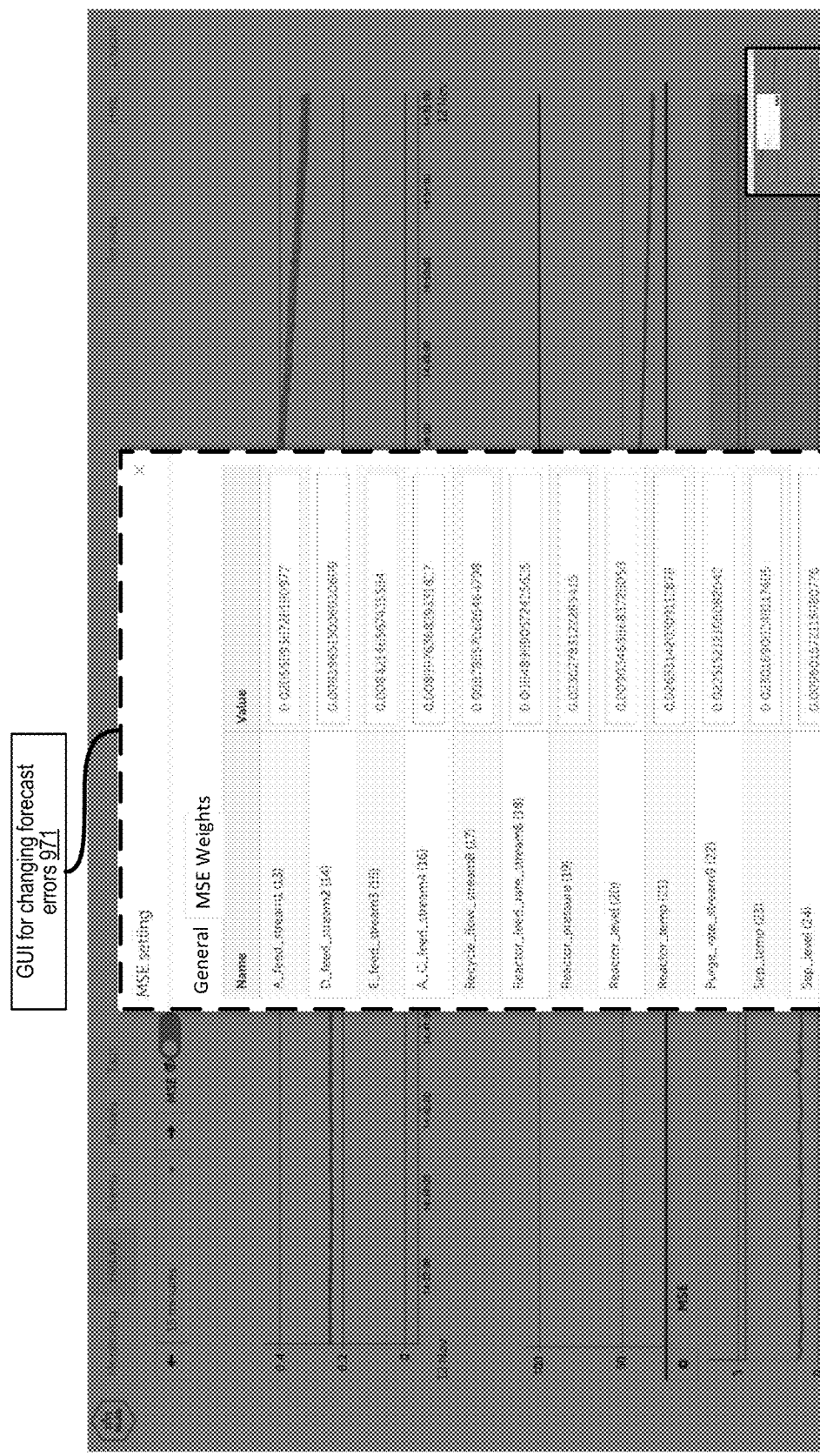
FIG. 11b presents a GUI element for changing the forecast errors according to exemplary aspects of the present disclosure.

In FIG. 11b, the GUI for changing the forecast errors 971 is additionally designed to display the values of the weighting factors for the forecast errors of each selected feature of the CPS and serves for receiving changes in the values of said weighting factors made by the user. In this case, the total forecast error will be recalculated, for example by the forecasting means 221, with the use of the altered values of said weighting factors.

In yet another particular exemplary aspect, at least one of the elements of the GUI for the grouping of features 912 is designed to obtain information about a group of features selected by the user, especially those pertaining to the same PID controller, and the element of the GUI for generating graphs 930 generates graphs of the mentioned values for the indicated monitoring time period for the features of the CPS from the selected group of features, allowing the user to quickly switch between different groups created, which may be linked to important sectors of the TP in the view of the user.

In one particular exemplary aspect, at least one GUI element for the displaying of groups of features 913 is designed to display the features of the CPS from generated groups of features. That is, as a result of the grouping of features by the GUI 912, groups of features displayed in GUI 913 will be generated, and the user is able to select or edit those groups, as well as display graphs of the values for the features of the CPS from those groups by means of GUI 930.

In yet another particular exemplary aspect, at least one element of the GUI is functionally able to generate sublists from the features of the CPS selected by the user and, upon the user selecting the mentioned sublist, to generate graphs of values for the features from the mentioned sublist (not shown in the figures).

Figure 13:
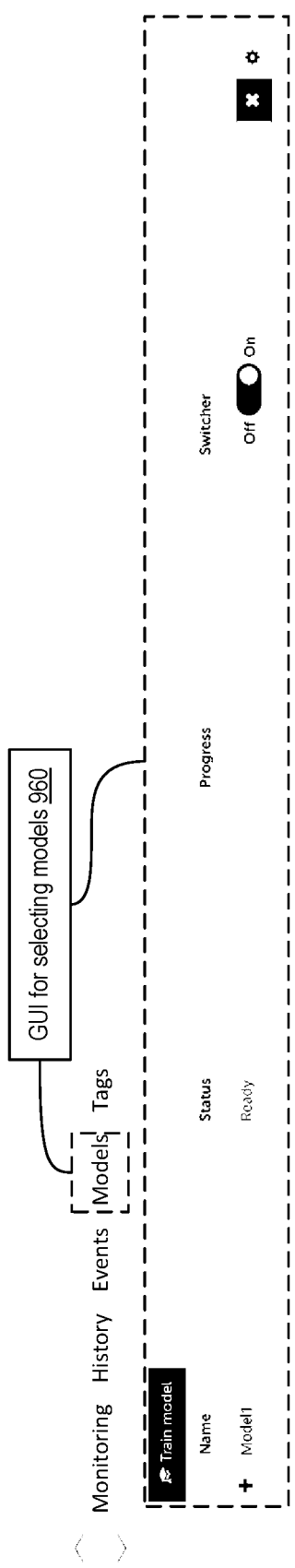
FIG. 13 presents a GUI element for selection of models according to exemplary aspects of the present disclosure.

FIG. 13 presents the GUI element for selection of models 960, which is designed to perform the selecting of the model for forecasting of the values of the features of the CPS.

Figure 14:
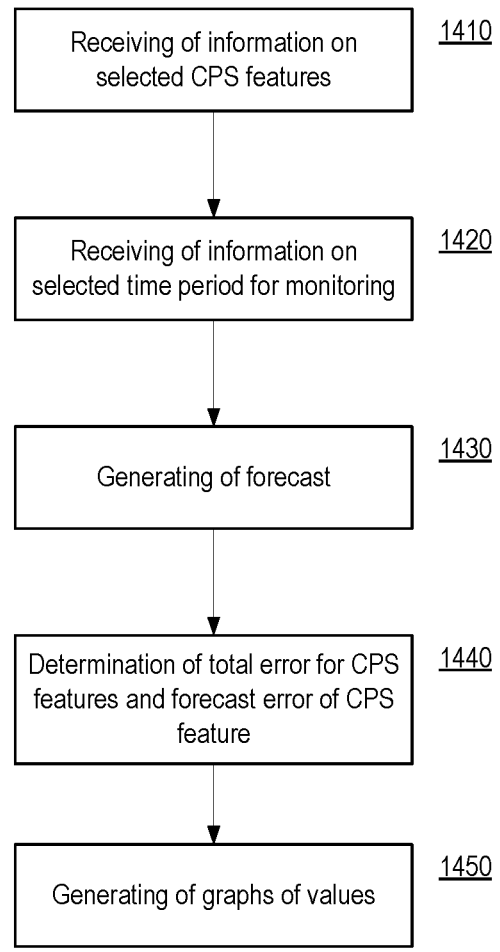
FIG. 14 presents a method of generating data for the monitoring of a cyber-physical system for the purpose of an early determination of anomalies in a graphic user interface (GUI) system containing a group of GUI elements according to exemplary aspects of the present disclosure.

FIG. 14 presents a method of generating data for the monitoring of a cyber-physical system for the purpose of an early determination of anomalies in the system of the graphic user interface (GUI). In step 1410, at least one GUI element for the selection of an feature 910, the element containing in particular a list of features of a cyber-physical system (CPS) is used to receive information about at least one CPS feature, selected by the user, from the mentioned list of features. Then, in step 1420, at least one GUI element for the selection of a period of time 920 is used to receive information about the period of time selected by the user for the monitoring of the selected features of the CPS. Next, in step 1430, the forecasting means 221 is used to make a forecast of the values of the features of the CPS for the indicated monitoring time period, using the model for forecasting the values of the selected features of the CPS. After this, in step 1440, the anomaly determination means 222 is used to determine the total forecast error for the selected features of the CPS and the forecast errors for each selected feature of the CPS during the indicated monitoring time period. As a result, in step 1450, at least one GUI element for generating graphs 930 is used to generate graphs in the monitoring time period for each of the following values needed for the monitoring of the CPS:

each selected feature of the CPS;
the forecast for each selected feature of the CPS;
the total forecast error for the features of the CPS;
the forecast errors for each selected feature of the CPS;
the threshold of the total forecast error.

The particular exemplary aspects previously described in FIG. 9-13 for the GUI system are also applicable to the method per FIG. 14.

Obviously, the system and method per FIG. 9-14 accomplish the stated technical results, namely, they provide a graphic user interface which allows the user to perform a monitoring of a cyber-physical system for the purpose of an early determination of anomalies, and also to realize an automated control by the user of the cyber-physical system for an early determination of anomalies. Furthermore, the stated technical problem will be solved, the problem involving the lack of a system and a method of generating data for the monitoring of a cyber-physical system, for the performing of a determination of anomalies in a graphic user interface system wherein the time elapsed from the moment of occurrence of an anomaly in the CPS to the moment of its detection is less than in the prior art.

Figure 15:
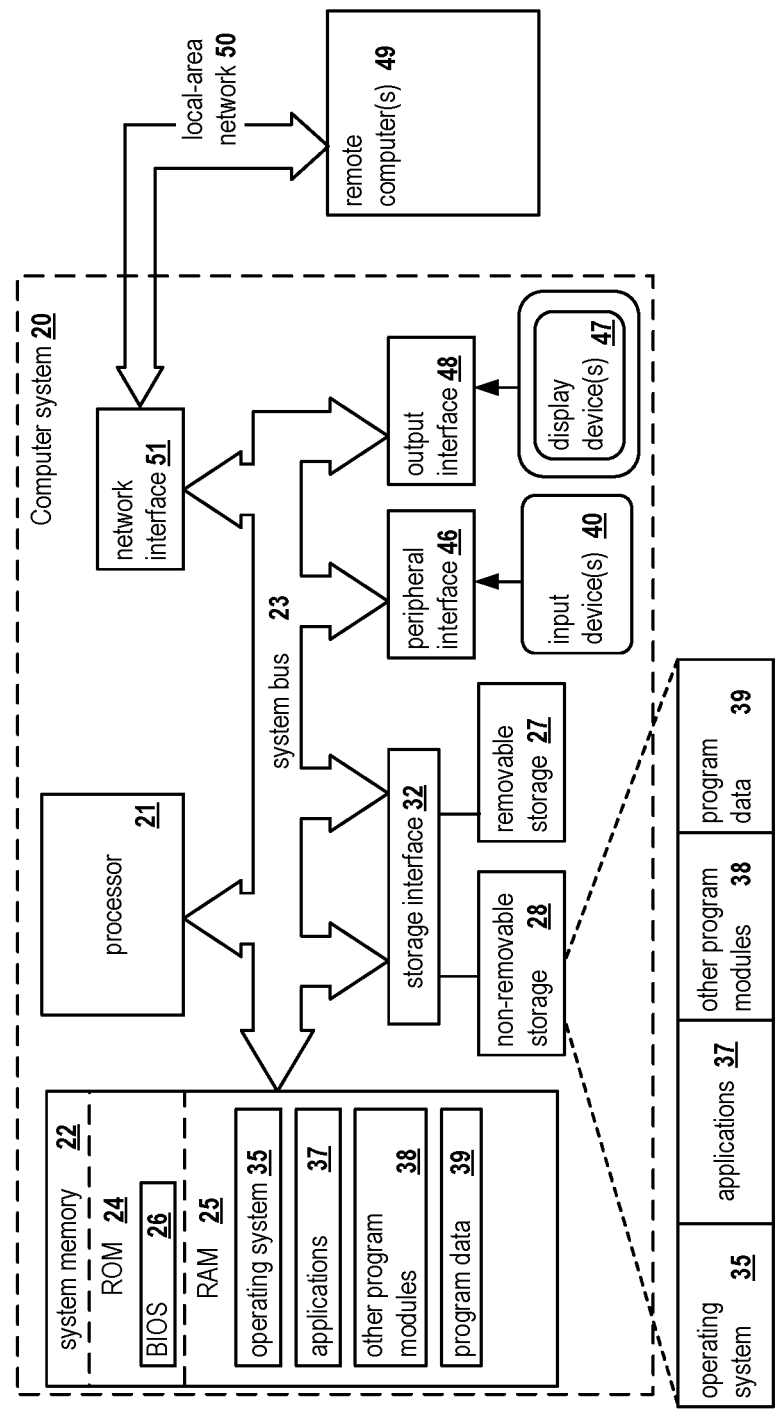
FIG. 15 is a block diagram illustrating a computer system, according to exemplary aspects of the present disclosure.

FIG. 15 is a block diagram illustrating a computer system 20 on which aspects of systems and methods of early determination of anomalies using a graphical user interface may be implemented in accordance with an exemplary aspect. It should be noted that the computer system 20 can correspond to system 100 for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 15, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of early determination of anomalies using a graphical user interface, the method comprising:

receiving information about one or more features of a cyber-physical system;

receiving information about a period of time for monitoring the one or more features;

generating a forecast of values of the one or more features of the cyber-physical system over the period of time based on a forecasting model for graphing in a graphical user interface;

determining a forecast error for each of the one or more features over the period of time, wherein the determined forecast error comprises a difference between corresponding forecasted value and an observed value of the one or more features;

determining a total error of the forecast for all of the one or more features, wherein the total error of the forecast comprises a weighted mean of the forecast errors for all of the one or more features over the period of time;

determining that the total error is greater than a total error threshold;

in response to determining that the total error is greater than the total error threshold, identifying a feature of the one or more features as a source of an anomaly in the cyber-physical system, if contribution of the forecast error of said feature to the total error is greater than contribution of other features of the one or more features to the total error; and generating a graph of forecast values of the identified feature in the graphical user interface.

2. The method of claim 1, further comprising: generating a graph displaying the forecast of values of the one or more features and the total error.

3. The method of claim 2, further comprising:

determining a mode of display of the data in the graph, wherein the mode comprises a real-time mode and a coding/decoding mode; and in response to the mode being real-time mode, generating a graph of values at a current moment of time.

4. The method of claim 1, further comprising:

generating a list of events related to an anomaly occurring on the cyber physical system;

detecting a selection of one or more of the events; and generating a graph of values for the selected one or more events at the time of occurrence of the anomaly for the time period.

5. The method of claim 4, wherein each feature corresponds to a list of events, and each list of events comprises: an identifier of the corresponding feature; a description of the corresponding feature; forecast errors for the corresponding feature; an observable value of the corresponding feature; a forecast value of the corresponding feature; the units of measurement of the corresponding feature; allowable limits of change of the corresponding feature; a link of the corresponding feature to equipment.

6. The method of claim 1, further comprising:

obtaining sample data of the cyber-physical system for a historical period of observation, wherein during the historical period the percentage anomalies does not exceed a threshold value;

generating a training sample comprising at least a moment of time when an anomaly has occurred;

training the model for forecasting values of the one or more features at every moment of time of the period of time specified using the training sample.

7. The method of claim 6, wherein the model for forecasting values is a neural network.

8. A system of early determination of anomalies using a graphical user interface, the system comprising:

a hardware processor configured to:

receive information about one or more features of a cyber-physical system;

receive information about a period of time for monitoring the one or more features;

generate a forecast of values of the one or more features of the cyber-physical system over the period of time based on a forecasting model for graphing in a graphical user interface;

determine a forecast error for each of the one or more features over the period of time, wherein the determined forecast error comprises a difference between corresponding forecasted value and an observed value of the one or more features;

determine a total error of the forecast for all of the one or more features wherein the total error of the forecast comprises a weighted mean of the forecast errors for all of the one or more features over the period of time;

determine that the total error is greater than a total error threshold;

in response to determining that the total error is greater than the total error threshold, identify a feature of the one or more features as a source of an anomaly in the cyber-physical system, if contribution of the forecast error of said feature to the total error is greater than contribution of other features of the one or more features to the total error; and generate a graph of forecast values of the identified feature in the graphical user interface.

9. The system of claim 8, the hardware processor further configured to: generate a graph displaying the forecast of values of the one or more features and the total error.

10. The system of claim 9, the hardware processor further configured to:

determine a mode of display of the data in the graph, wherein the mode comprises a real-time mode and a coding/decoding mode; and in response to the mode being real-time mode, generate a graph of values at a current moment of time.

11. The system of claim 8, the hardware processor further configured to:

generate a list of events related to an anomaly occurring on the cyber physical system;

detect a selection of one or more of the events; and generate a graph of values for the selected one or more events at the time of occurrence of the anomaly for the time period.

12. The system of claim 11, wherein each feature corresponds to a list of events, and each list of events comprises: an identifier of the corresponding feature; a description of the corresponding feature; forecast errors for the corresponding feature; an observable value of the corresponding feature; a forecast value of the corresponding feature; the units of measurement of the corresponding feature; allowable limits of change of the corresponding feature; a link of the corresponding feature to equipment.

13. The system of claim 8, the hardware processor further configured to:

obtain sample data of the cyber-physical system for a historical period of observation, wherein during the historical period the percentage anomalies does not exceed a threshold value;

generate a training sample comprising at least a moment of time when an anomaly has occurred;

train the model for forecasting values of the one or more features at every moment of time of the period of time specified using the training sample.

14. The system of claim 13, wherein the model for forecasting values is a neural network.

15. A non-transitory computer-readable medium, storing instructions thereon of early determination of anomalies using a graphical user interface, the instructions comprising:
   receiving information about one or more features of a cyber-physical system;
   receiving information about a period of time for monitoring the one or more features;
   generating a forecast of values of the one or more features of the cyber-physical system over the period of time based on a forecasting model for graphing in a graphical user interface;
   determining a total error of the forecast for all of the one or more features and determining a forecast error for each of the one or more features over the period of time, wherein the determined forecast error comprises a difference between corresponding forecasted value and an observed value of the one or more features;
   determining a total error of the forecast for all of the one or more features, wherein the total error of the forecast comprises a weighted mean of the forecast errors for all of the one or more features over the period of time;
   determining that the error for one feature of the one or more features is greater than a predetermined threshold;
   determining that the total error is greater than a total error threshold;
   identifying the one feature in response to determining that the total error is greater than the total error threshold, identifying a feature of the one or more features as a source of an anomaly in the cyber-physical system, if contribution of the forecast error of said feature to the total error is greater than contribution of other features of the one or more features to the total error; and
   generating a graph of forecast values of the identified feature in the graphical user interface.

16. The medium of claim 15, the instructions further comprising: generating a graph displaying the forecast of values of the one or more features and the total error.

17. The medium of claim 16, the instructions further comprising:
   determining a mode of display of the data in the graph, wherein the mode comprises a real-time mode and a coding/decoding mode; and
   in response to the mode being real-time mode, generating a graph of values at a current moment of time.

* * * * *